United States Patent
Frank et al.

(10) Patent No.: US 10,997,557 B2
(45) Date of Patent: May 4, 2021

(54) METHOD, APPARATUS, AND COMPUTER PROGRAM PRODUCT FOR AUTHORIZING AND AUTHENTICATING USER COMMUNICATION WITHIN AN ENTERPRISE GROUP-BASED COMMUNICATION PLATFORM

(71) Applicant: Slack Technologies, Inc., San Francisco, CA (US)

(72) Inventors: Ilan Frank, Los Altos, CA (US); Daniel Stewart Butterfield, Vancouver (CA); Callum Henderson-Begg, San Francisco, CA (US); April Underwood, San Francisco, CA (US); Leah Jones, San Francisco, CA (US); Myles Grant, San Francisco, CA (US); Todd Wirth, San Francisco, CA (US); Eric Vierhaus, San Francisco, CA (US); Samantha Stoller, San Francisco, CA (US); Gregory Pelly, San Francisco, CA (US); Yongxing Deng, San Francisco, CA (US); Matthew Mullen, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 406 days.

(21) Appl. No.: 15/782,680

(22) Filed: Oct. 12, 2017

(65) Prior Publication Data
US 2018/0197144 A1 Jul. 12, 2018

Related U.S. Application Data

(60) Provisional application No. 62/554,952, filed on Sep. 6, 2017, provisional application No. 62/408,670, filed on Oct. 14, 2016.

(51) Int. Cl.
*G06F 16/00* (2019.01)
*G06Q 10/10* (2012.01)
(Continued)

(52) U.S. Cl.
CPC ......... *G06Q 10/103* (2013.01); *H04L 63/101* (2013.01); *H04L 63/104* (2013.01);
(Continued)

(58) Field of Classification Search
None
See application file for complete search history.

(56) References Cited

U.S. PATENT DOCUMENTS 7,730,094 B2 6/2010 Kaler et al.
8,874,558 B1 10/2014 He et al.
(Continued)

OTHER PUBLICATIONS

"Die, Email, Diet A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
(Continued)

*Primary Examiner* — Tuankhanh D Phan
(74) *Attorney, Agent, or Firm* — Erise IP, P.A.,

(57) ABSTRACT

The disclosure generally relates to an enterprise group-based communication system. Group-based communication channels may be created and access by client devices associated with users within the enterprise group-based communication system that have various identifiers associated therewith.

29 Claims, 8 Drawing Sheets

(51) Int. Cl.
*H04L 29/06* (2006.01)
*H04W 4/08* (2009.01)
*H04W 12/08* (2021.01)
*H04W 12/76* (2021.01)

(52) U.S. Cl.
CPC ............. *H04W 4/08* (2013.01); *H04W 12/08* (2013.01); *H04W 12/76* (2021.01)

(56) References Cited

U.S. PATENT DOCUMENTS

| | | | |
|---|---|---|---|
| 9,171,083 | B2 | 10/2015 | Blumenfeld et al. |
| 9,940,394 | B1 | 4/2018 | Grant et al. |
| 2005/0289342 | A1 | 12/2005 | Needham et al. |
| 2006/0041661 | A1 | 2/2006 | Erikson et al. |
| 2008/0104665 | A1 | 5/2008 | Naldurg et al. |
| 2008/0301766 | A1 | 12/2008 | Makino et al. |
| 2010/0030734 | A1 | 2/2010 | Chunilal |
| 2012/0030734 | A1 | 2/2012 | Wohlert |
| 2012/0054217 | A1 | 3/2012 | Clarke |
| 2012/0089698 | A1 | 4/2012 | Tseng |
| 2012/0190363 | A1* | 7/2012 | Maeda .............. H04W 36/0072 455/435.1 |
| 2012/0240062 | A1* | 9/2012 | Passmore ................ H04L 51/32 715/758 |
| 2013/0073979 | A1 | 3/2013 | Shepherd et al. |
| 2013/0173578 | A1 | 7/2013 | Epstein |
| 2013/0297689 | A1 | 11/2013 | Brat et al. |
| 2013/0332812 | A1 | 12/2013 | Houston |
| 2014/0052548 | A1 | 2/2014 | Dokken, Jr. |
| 2014/0244834 | A1 | 8/2014 | Guedalia et al. |
| 2015/0135261 | A1 | 5/2015 | Park et al. |
| 2015/0261742 | A1 | 9/2015 | Gandhi et al. |
| 2015/0326522 | A1* | 11/2015 | Pu ....................... G06F 21/6245 726/26 |
| 2016/0019661 | A1 | 1/2016 | Bouganim et al. |
| 2016/0055160 | A1 | 2/2016 | Himel et al. |
| 2016/0132344 | A1 | 5/2016 | Funk et al. |
| 2016/0203181 | A1 | 7/2016 | Verma et al. |
| 2016/0267544 | A1 | 9/2016 | Flood et al. |
| 2016/0285816 | A1 | 9/2016 | Schmid et al. |
| 2016/0323619 | A1 | 11/2016 | Lewis et al. |
| 2017/0201575 | A1 | 7/2017 | Song et al. |
| 2017/0250989 | A1 | 8/2017 | Bhattacharya et al. |
| 2017/0331828 | A1 | 11/2017 | Caldera et al. |
| 2017/0374001 | A1 | 12/2017 | Ifrim et al. |
| 2018/0287982 | A1 | 10/2018 | Draeger et al. |

OTHER PUBLICATIONS

"How Slack changed the way we work by pulling the customer experience first", Repeat Customer Podcast, Episode 3, [online][retrieved May 9, 2019]. Retrieved from the Internet: <URL: https://www.zendesk.com/resources/slack-customer-experience!, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications—", FUJITSU Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
U.S. Appl. No. 62/554,952, filed Sep. 6, 2017, In re: Frank entitled Method, Apparatus, And Computer Program Product For Authorizing And Authenticating User Communication Within An Enterprise Group-Based Communication Platform.

* cited by examiner

300

| 313 | 305 | 307 | 309 | 311 |
|---|---|---|---|---|
| global ID | user ID | super admin | group ID | group admin |
| 1000000006450806304 | amy.jones@abc.com | Y | Mobile | Y |
| | | | Security | N |
| | | | Core Product | N |
| 1000000006450806340 | bob.woods@abc.com | N | Marketing | Y |
| 1000000006450806699 | chris.grey@abc.com | N | Mobile | N |
| | | | BizOps | N |

METHOD, APPARATUS, AND COMPUTER PROGRAM PRODUCT FOR AUTHORIZING AND AUTHENTICATING USER COMMUNICATION WITHIN AN ENTERPRISE GROUP-BASED COMMUNICATION PLATFORM

The present application claims priority to U.S. Provisional Application Ser. No. 62/554,952, titled "METHOD, APPARATUS, AND COMPUTER PROGRAM PRODUCT FOR AUTHORIZING AND AUTHENTICATING USER COMMUNICATION WITHIN AN ENTERPRISE GROUP-BASED COMMUNICATION PLATFORM," filed Sep. 6, 2017, and to U.S. Provisional Application Ser. No. 62/408,670, titled "MESSAGING SEARCH AND MANAGEMENT APPARATUSES, METHODS AND SYSTEMS," filed Oct. 14, 2016, the contents of which are incorporated herein by reference in their entirety.

BACKGROUND

An enterprise may support communication and collaboration among users across the enterprise. Applicant has identified a number of deficiencies and problems associated with enterprise communications. Through applied effort, ingenuity, and innovation, many of these identified problems have been solved by developing solutions that are included in embodiments of the present disclosure, many examples of which are described in detail herein.

BRIEF SUMMARY

The disclosure relates to a group-based communication server for authorizing communication in an enterprise group-based communication system. The group-based communication server comprises a processor and memory, the memory including computer program code. The memory and the computer program code configured to, with the processor cause the group-based communication server to receive a channel creation request to create a group-based communication channel within the enterprise group-based communication system, and the channel creation request includes channel settings. The group-based communication server is further configured to access an enterprise settings database to retrieve enterprise settings that regulate all group-based communication channels in the enterprise group-based communication system. The group-based communication server further configured to determine, based on a comparison of the channel settings and the enterprise settings, if the group-based communication channel is authorized for creation, and in circumstances when it is determined that the group-based communication channel is authorized create the group-based communication channel according to the channel settings; store messaging communication that is input into the group-based communication channel to either an enterprise storage location or a group storage location based on the channel settings; receive a channel access request from a client device for access to the group-based communication channel; retrieve a global identifier or a group identifier associated with the client device request from an identifier database; and determine whether to authorize the channel access request based on comparing the channel settings to one of the global identifier or the group identifier.

In some embodiments, the channel settings comprise a channel type value that indicates access control parameters, and the group-based communication server is further configured to create the group-based communication channel according to the indicated access control parameters.

The group-based communication server is optionally additionally configured to determine that the channel type value indicates an enterprise promoted channel type, and in response authorize access rights for each member of the group-based communication system to the group-based communication channel.

The group-based communication server is optionally additionally configured to determine that the channel type value indicates a group-to-group channel type, and in response authorize access rights for members of the group-based communication system that are associated with one or more identified groups to the group-based communication channel, wherein the identified groups are indicated in the channel settings.

The group-based communication server is optionally additionally configured to determine that the channel type value indicates a private channel type, and in response authorize access rights for members of a single identified group to the group-based communication channel, wherein the single identified group is indicated in the channel settings.

The group-based communication server is optionally additionally configured to receive one or more messaging communications configured for display within the group-based communication channel and store, in the enterprise storage location or the group storage location, the one or more messaging communications, wherein the enterprise storage location or group storage location is further determined by a channel name string present in the channel settings.

In some embodiments, the channel access request includes a user identification value associated with the client device or the global identifier associated with the client device. The user identification value is different from the global identifier and the group identifier, and the group-based communication server is further configured to retrieve, from the identifier database, a group identifier associated with the client device based on the user identification value or the global identifier, and determine whether to authorize the client device access to the group-based communication channel based on a comparison of the group identifier and the channel settings.

The group-based communication server is optionally additionally configured to compare the received channel settings to the enterprise settings, and determine a first channel setting that does not comply with a corresponding first enterprise setting, and set the first channel to be equal to the first enterprise setting.

In some embodiments, the channel settings include an originator identifier that indicates the originator of the channel creation request for the group-based communication channel.

The group-based communication server is optionally additionally configured to retrieve, from the identifier database, the global identifier associated with the client device and determine one or more group identifiers associated with the global identifier. The group-based communication server is optionally and additionally configured to determine whether to authorize the client device access to the group-based communication channel based on a comparison of the one or more group identifiers with the two or more identified groups. In circumstances where at least one of the one or more group identifiers does not match at least one of the two or more identified groups, the group-based communication server is optionally additionally configured to determine, based on access control parameters of the two or more identified groups if at least one of the two or more identified groups is joinable, and in response to determining that at least one of the two or more identified groups is joinable transmit a request to a client device of a group administrator of at least one of the two or more identified groups requesting access to the group for the client device.

BRIEF DESCRIPTION OF THE DRAWINGS

Figure 1:
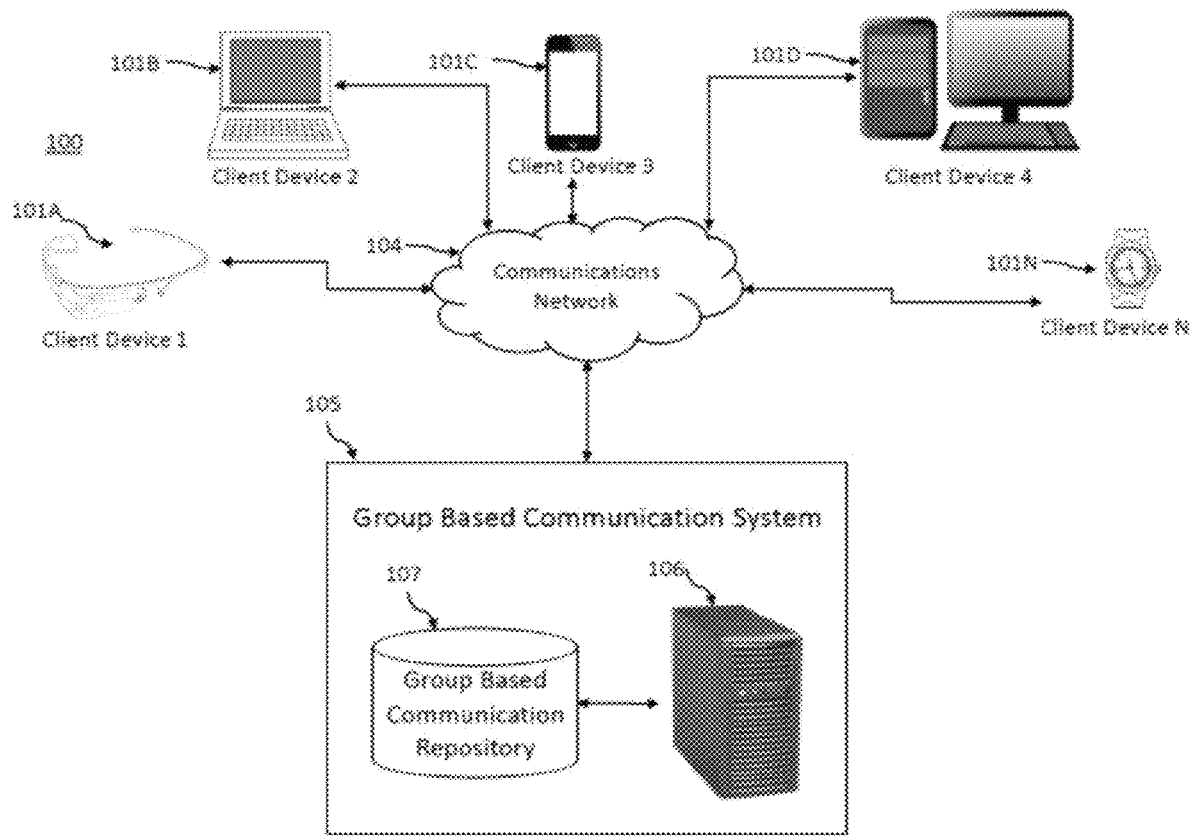
Figure 2:
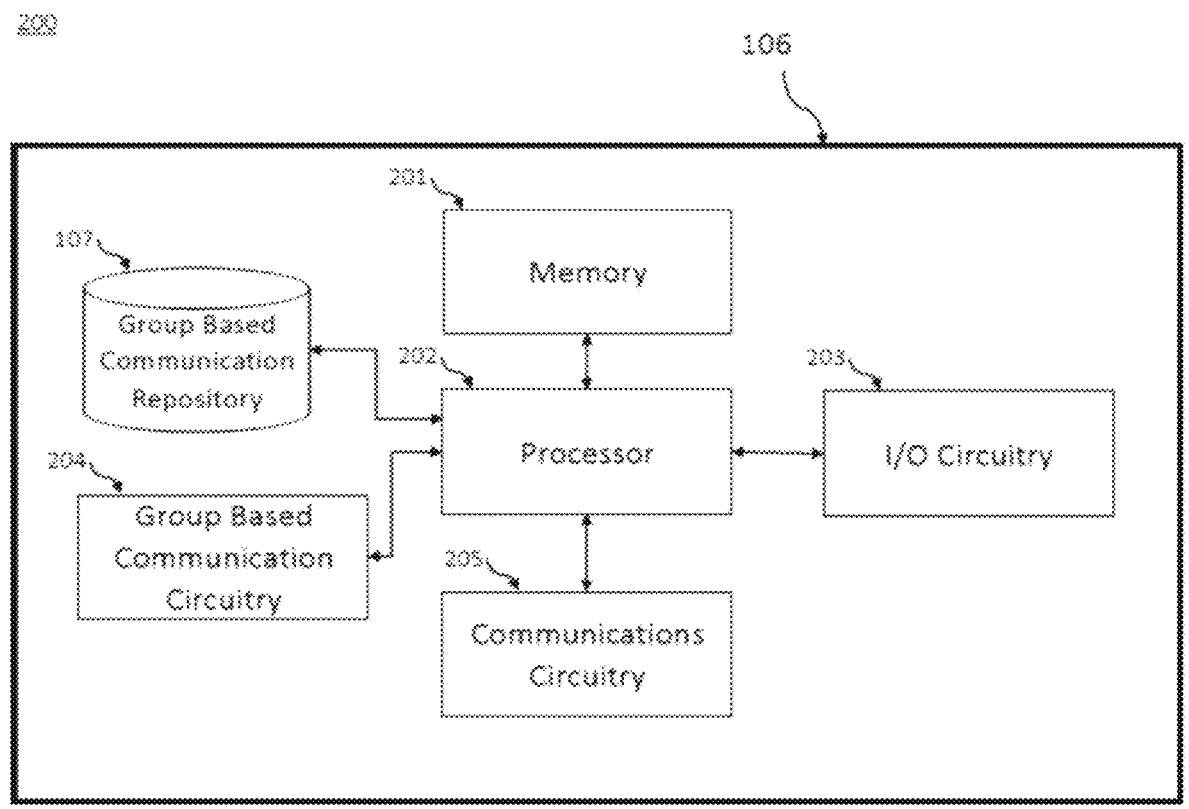
Figures 3A, 3B:
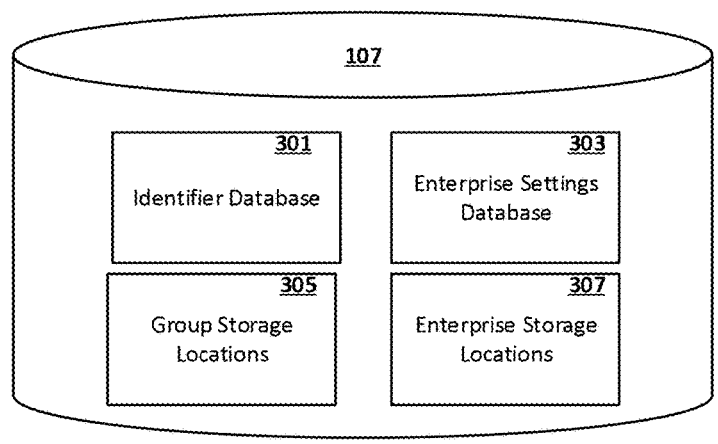
Figure 4:
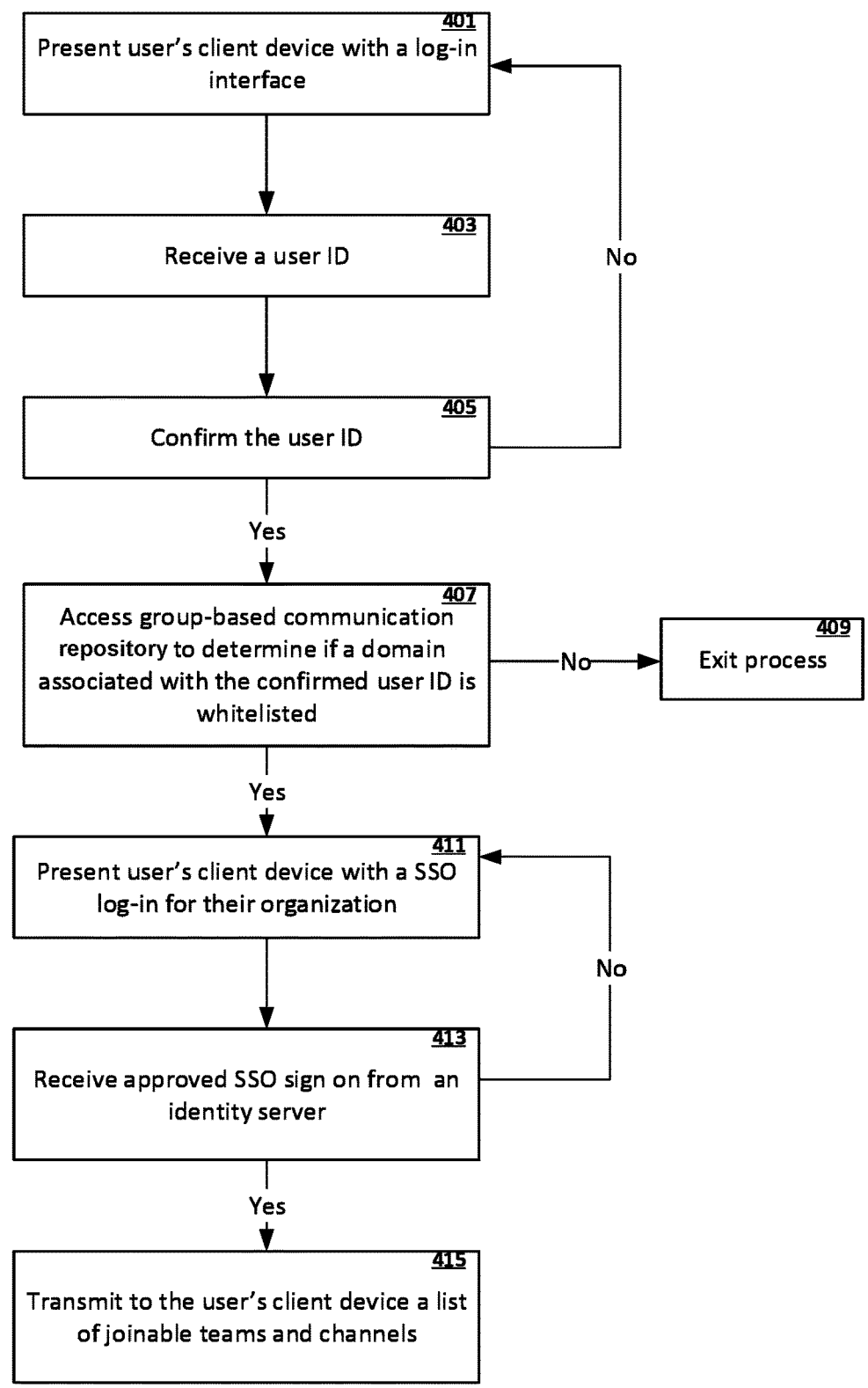
Figure 5:
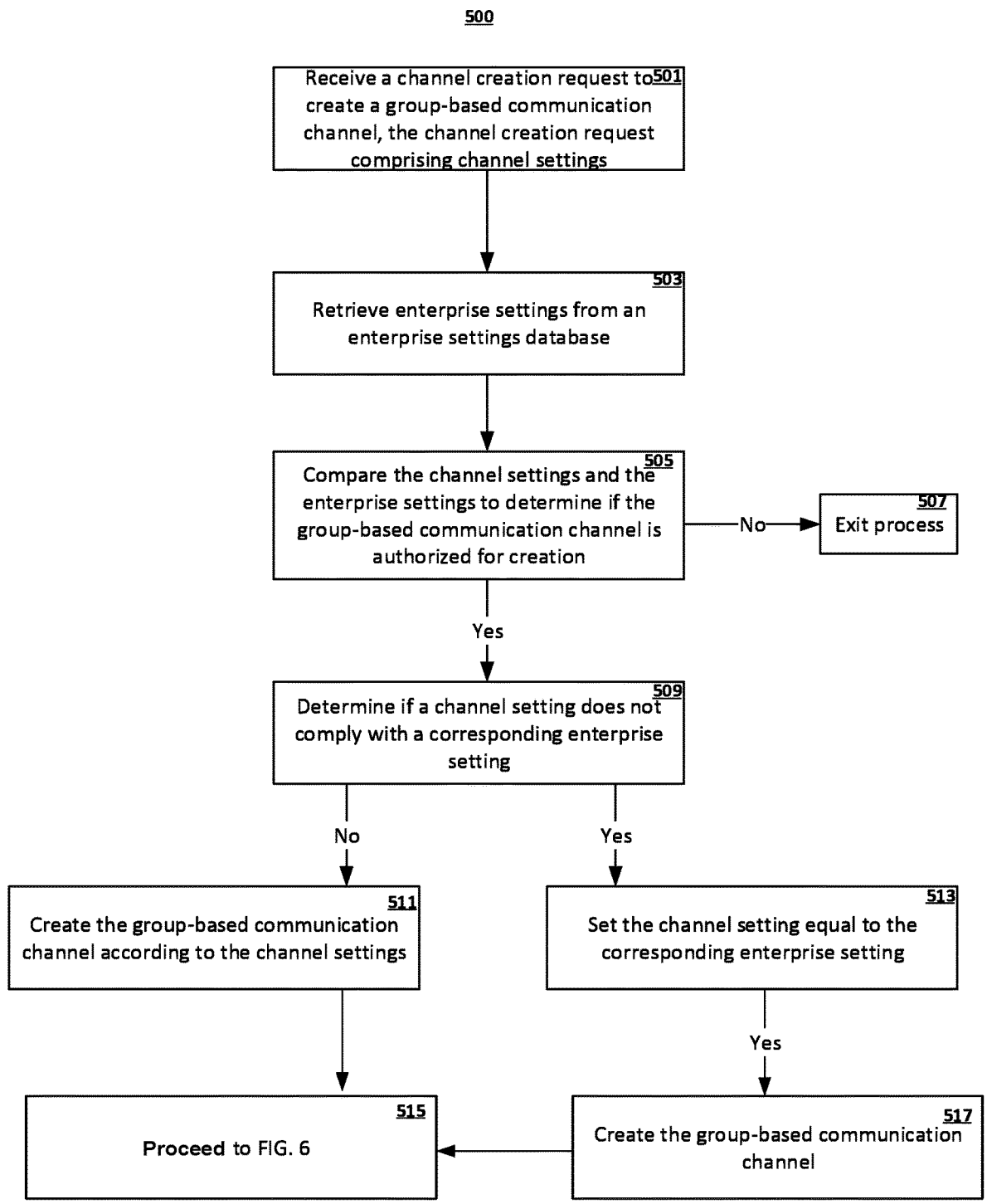
Figure 6:
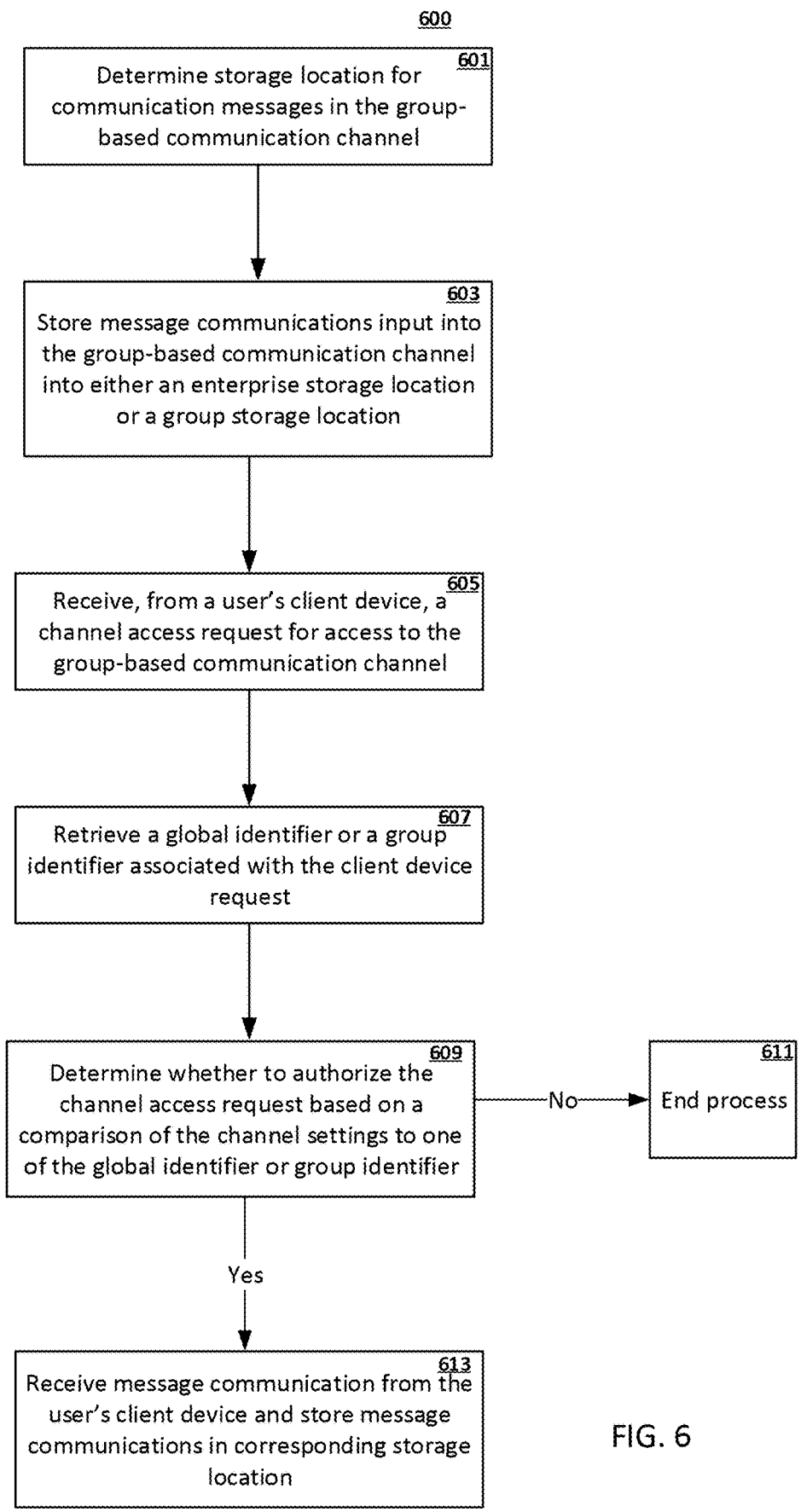
Figure 7:
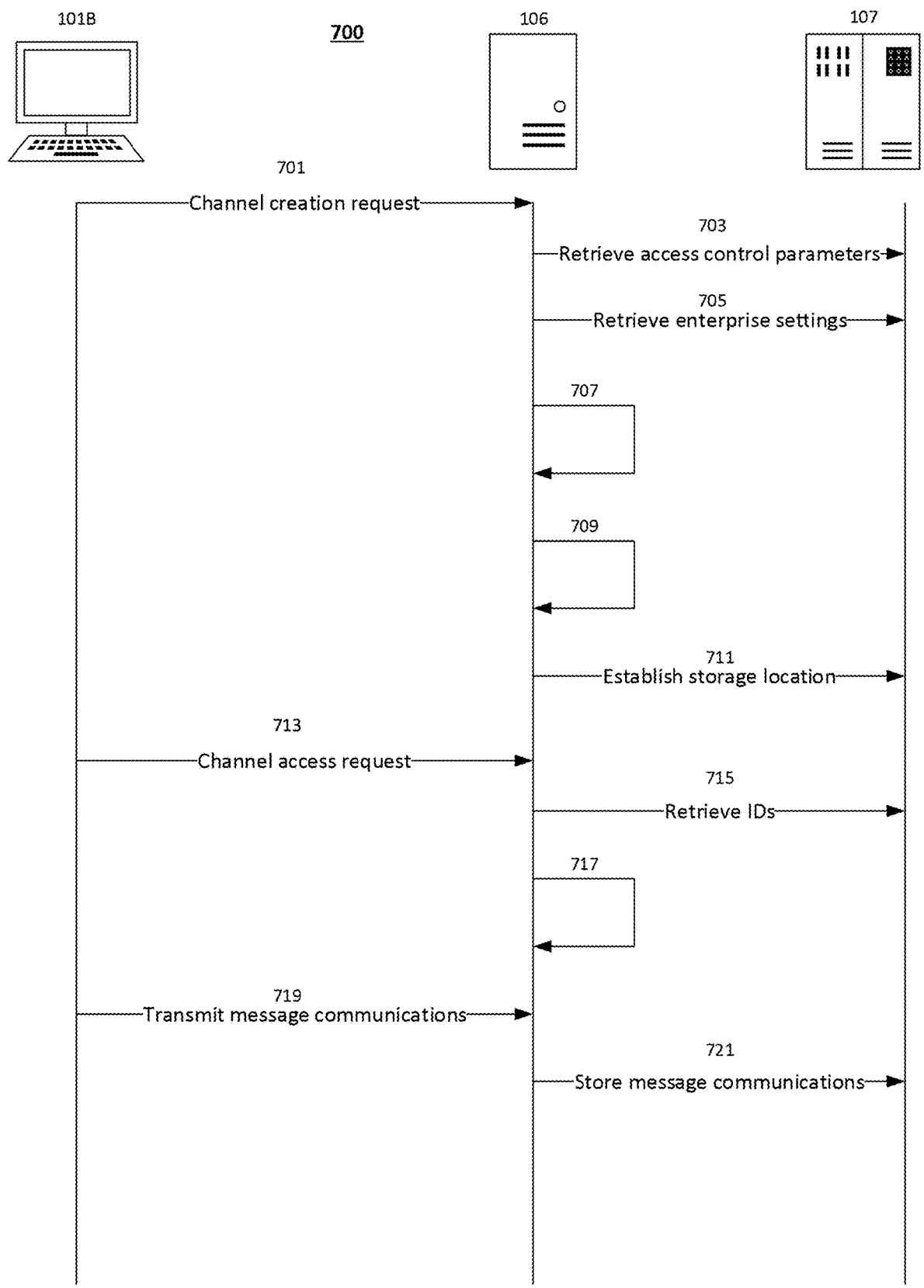
Figure 8:
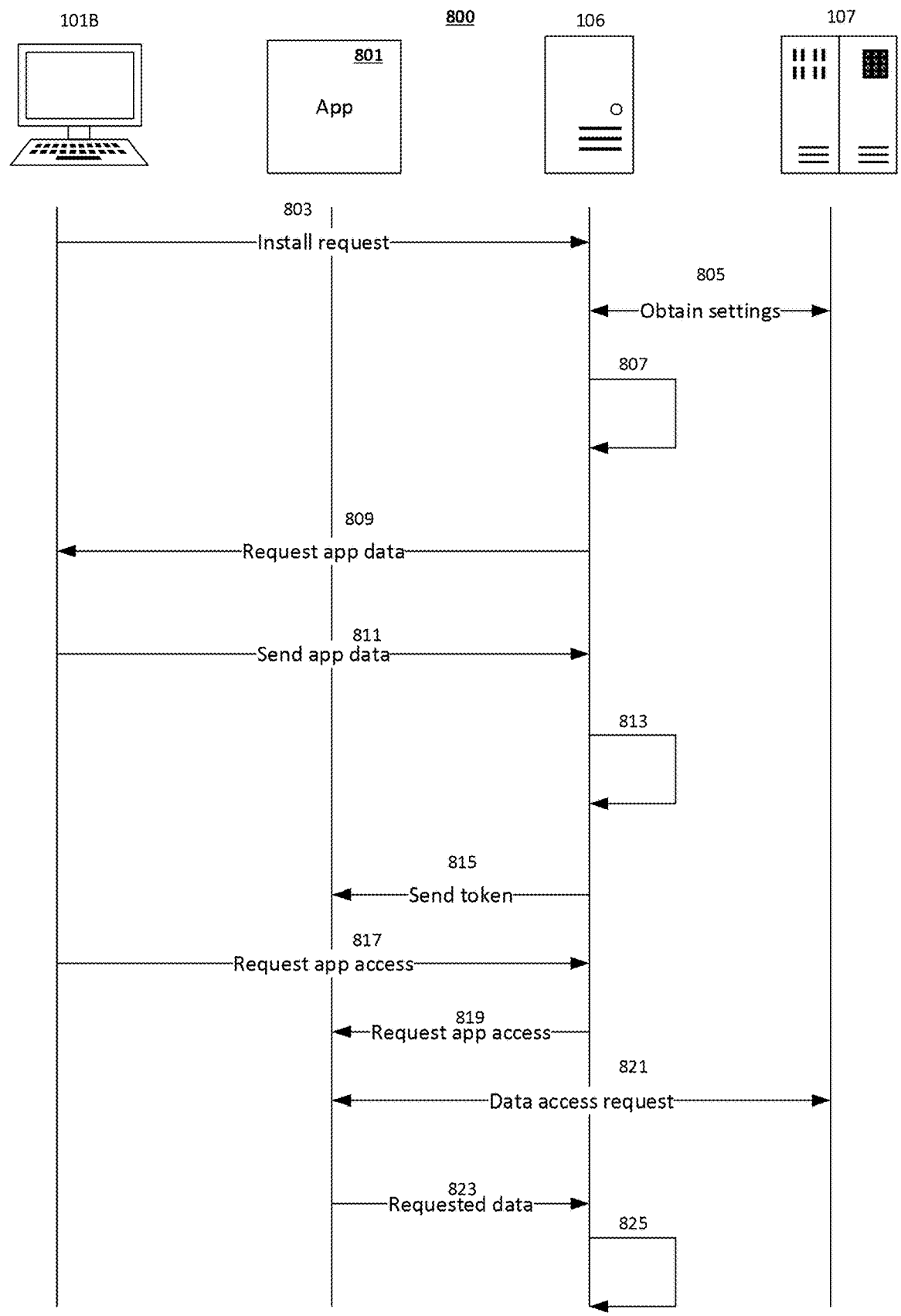

Having thus described the disclosure in general terms, reference will now be made to the accompanying drawings, which are not necessarily drawn to scale, and wherein:

FIG. 1 is a system architecture diagram of a group-based communication system configured to practice embodiments of the present disclosure;

FIG. 2 is an exemplary schematic diagram of a computing entity according to one embodiment of the present disclosure;

FIG. 3A illustrates an exemplary schematic diagram of a group-based communication repository according to embodiments of the present disclosure;

FIG. 3B illustrates an exemplary database table stored inside an exemplary identifier database according to embodiments of the present disclosure;

FIG. 4 illustrates an exemplary process according to one embodiment of the present disclosure;

FIG. 5 illustrates an exemplary process according to one embodiment of the present disclosure;

FIG. 6 illustrates an exemplary process according to one embodiment of the present disclosure;

FIG. 7 illustrates an exemplary process that may be carried out in an exemplary group-based communication system according to embodiments of the present disclosure; and FIG. 8 illustrates an exemplary process for an application to be stored and used within a group-based communication channel according to embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to a group-based communication with an enterprise group-based communication system. The enterprise group-based communication system described in this disclosure comprises a group-based communication server and a group-based communication repository. The group-based communication server can authorize the creation of group-based communication channels and authorize and monitor access to the created group-based communication channels. The group-based communication server interacts with a plurality of client devices requesting to communicate via the group-based communication channels.

Deploying an enterprise group based communication system introduces many technical challenges. The lack of a unified client directory requires a group-based communication system to have awareness of multiple clients associated with multiple groups. Group-based communication channels, without a scaled enterprise solution, can be created without any administrator governance regarding channel policies. Discoverability of available groups within an enterprise group-based communication system is tedious and overly burdensome due to the number of groups and group-based channels as well as the lack of a unified client directory. Providing automated electronic support is further complicated by the lack of the unified client directory and lack of policy governance.

In addition to the challenges above, without an enterprise solution to a group-based communication system, digital content auditing and retention within the group-based communication system is not possible.

The inventors have identified that the system resources and time allocated to an enterprise deployment of a group-based communication system are easily exhausted and compromised as a result of the complex design, storage needs, and communication needs of a group-based communication system. The inventors have determined that the embodiments of the present disclosure enable a reduction in required computing resources and an improvement in the efficiency of data processing in the context of deployment of an enterprise group-based communication system.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a global identifier, a user identifier, one or more group-based communication channel identifiers associated with group-based communication channels that the user has been granted access to (i.e. a group identifier), an indication as to whether the user is an admin of any group-based communication channels, an indication as to whether the user is a super admin, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier," "channel identifier," or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like. The group identifier may be related to a user's status in an organization (e.g. on the Mobile Development team), status to a channel (e.g. a member of a group that has access to a specific channel) and the like.

As used herein, the terms "messaging communication" and "message" refer to any electronically generated digital content object provided by a user using a client device and that is configured for display within a group-based communication channel. Messaging communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising one or more of the following: a sending user identifier, a message identifier, message contents, a global identifier, user identification, originator identifier a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message or file (e.g., access to the message, such as having the message or file return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "enterprise group-based communication system" refers to a networked electronic communications environment comprising a group-based communication repository and a group-based communication server that is configured to enable group-based collaborative communication between members of an enterprise. In some embodiments, the enterprise group-based communication system may be operated and instituted by a third-party. The enterprise group-based communication system has increased requirement for availability, scalability, performance, compatibility and security over non-enterprise networks (e.g., a home internet network) and may span multiple enterprises and allow cross collaboration between not only members of different groups within an enterprise or organization, but also collaboration between members and teams of multiple organizations or enterprises.

The term "enterprise" should be understood to refer to a company, organization and the like. These terms are used interchangeably throughout the disclosure.

The term "channel creation request" refers to one or more items of data by which a user of an enterprise group-based communication system may request to create a group-based communication channel. The channel creation request may originate from a user's client device. The channel creation request comprises desired channel settings as well as an originator identifier.

The term "channel access request" refers to one or more items of data by which a client device of an enterprise group-based communication system may request access to a group-based communication channel via the group-based communication server. The channel access request comprises a group-based communication channel identifier. In some embodiments, the channel access request may further comprise a global identifier associated with the requesting client device, a user identifier associated with the requesting client device, and/or a group identifier associated with the requesting client device.

The term "access rights" refers to parameters for controlling the ability of users to view, change, navigate, and execute contents of the group-based communication system.

The term "invitation to join" refers to one or more items of data by which a client device of an enterprise group-based communication system may provide access (e.g. by sending a group identifier or group-based communication channel identifier) to a group-based communication channel or a group. The invitation to join may comprise a group-based communication channel identifier, a group identifier, a recipient's global identifier and/or a recipient's user identifier.

The term "originator identification" or "originator identifier" refers to one or more items of data by which the originator of a channel creation request or a channel access request may be identified. The originator identification may be an email address, user identifier, global identifier, an IP address, or any other type of information that can identify a requesting entity. In some embodiments the originator identification may include a group identifier, which may uniquely identify a group associated with the originator of the channel creation request or channel access request.

The term "user identification value" or "user identifier" refers to one or more items data by which a user of a client device may be uniquely identified. In some embodiments, the user identification may be an email address, a unique identification string, an employee number, a social security number, a driver's license number, and the like.

The term "channel settings" refers to various defined or definable parameters of a group-based communication channel. The channel settings may comprise a channel type, a channel name string, and a channel purpose string. A channel type refers to an indicator that informs a group-based communication server that the group-based communication channel is of at least one of the following types: an enterprise directed channel type, an enterprise promoted channel type, group-to-group channel type, and a private channel type. A channel name string refers to a data structure containing a string of alphanumerical characters for identifying a channel in non-technical terms. A channel purpose string refers to a data structure containing a string of alphanumerical characters that indicates to a group-based communication server and/or a user a purpose of the group-based communications channel. In some examples, a channel purpose string may contain a channel purpose such as "to work on project Nucleus." Channel settings may also include a message retention window that indicates a period of network time during which messages associated with a group-based communication channel are retained within a group-based communication repository. Upon expiration of the period of network time (i.e., the message retention window), a message or file associated with the message retention window may be deleted from a group-based communication repository. Channel settings may also include one or more of a group capacity and a user capacity that, when applicable, indicates the number of groups (or users) authorized to access the particular group-based communication channel; and, when applicable one or more group identifier values that indicate the group identifier(s) of one or more groups authorized to access the group-based communication channel. In some embodiments, if a user associated with a client device attempts to access a group-based communication channel and the user capacity has been reached, the client device may not be permitted to access the group-based communication channel. The channel settings may also include one or more authorized application identifiers that indicate to a group-based communication server which applications are authorized to be downloaded and utilized in the group-based communication channel. In embodiments, if an application attempts to access a group-based communication channel and the application is not associated with an authorized application identifier, the application may not be granted access to the group-based communication channel.

The term "enterprise directed channel type" refers to a data type associated with a group-based communication channel within an enterprise that indicates to a group-based communication server that every member of an organization is allowed to access the group-based communication channel. For example, every member of an organization has one or more group-based communication server issued identifiers, including one or more of a global identifier and a user identifier. When a client device attempts to accesses a group-based communication channel associated with the enterprise directed channel type, the group-based communication server compares one or more user or global identifiers to an authorized list (which contains all members of the organization) to determine if a user associated with the client device has authorized access rights to the group-based communication channel. For example, if a user is associated with a global identifier, this may signify that the user is able to access an enterprise directed channel. In some embodiments, only super administrators have the ability to edit messages in an enterprise directed channel. All other members of the enterprise directed channel may only access (but not edit or delete) messages in the enterprise directed channel. For example, a super administrator may define access control rights for which members of the organization or enterprise may create an enterprise directed channel type and also which members of the organization or enterprise may post (e.g., write) messages in the enterprise directed channel type.

The term "enterprise promoted channel type" refers to a data type associated with a group-based communication channel within an enterprise that indicates to a group-based communication server that the group-based communication channel is an opt-in group-based communication channel, default channel type, mandatory channel type, or a private group-based communication channel type. In a private group-based communication channel type, access control parameters may comprise a whitelist of user identifiers who are allowed to access the group-based communication channel. For example, access control parameters may specifically detail certain user identifiers or global identifiers associated with users who may be allowed access to a private group-based communication channel associated with the enterprise promoted channel type.

The term "public opt-in enterprise promoted channel type" refers to a data type associated with a group-based communication channel within an enterprise that to a group-based communication server to whitelist (i.e., grant access to) all users in an organization or enterprise based on one or more user identifiers associated with the user that indicate that the user is a part of the organization or enterprise. For example, if a user is associated with a group identifier that is associated with a group within the organization, then the group identifier may be included in a whitelist such that every user associated with the group identifier is granted access to the group-based communication channel. In another example, if a user is associated with a global identifier that indicates the user is a member of the organization or enterprise, then every global identifier associated with the organization may be included in a whitelist.

The term "public default enterprise promoted channel type" refers to a data type associated with a group-based communication channel within an enterprise that indicates to a group-based communication server that those users identified in the access control parameters can automatically have a group identifier added to the identified users' profile such that the user is granted the group-based communication channel. Thus, public default enterprise promoted channel type group-based communication channels automatically accept requests from users to access the group-based communication channel.

The term "public mandatory enterprise promoted channel type" refers to a data type associated with a group-based communication channel within an enterprise that indicates to a group-based communication server to automatically, for those users having their associated identifiers identified in the access control parameters, add a group identifier to the identified users' profile such that the user is allowed to access the group-based communication channel. In some embodiments, the associated group identifier is not removable from the user profile by the user. Thus, the public mandatory enterprise promoted channel type not only automatically associates a group-based communication channel identifier with the user profile (i.e., joins the user to the group-based communication channel), but also disables a user's ability to disassociate with the group-based communication channel.

The term "group-to-group channel type" refers to a data type associated with a group-based communication channel within an enterprise that indicates to a group-based communication server that group-based communication channel is shared between two or more authorized teams within an organization or enterprise. Each of the authorized teams can be identified by a group identifier associated with channel settings associated with the group-based communication channel. A group-to-group channel type may also be referred to as a cross-work space channel type.

The term "private channel type" refers to a data type associated with a group-based communication channel within an enterprise that indicates to a group-based communication server a defined authorized list (i.e., whitelist) of user identifiers (e.g., user identifiers, global identifiers) associated with users who are allowed to access the group-based communication channel. Group-to-group, enterprise promoted, and enterprise directed channel types may all be private so long as their access control list is confined to specific user identifiers associated with users.

The terms "group administrator," "group admin," or "team administrator," or "team admin" refers to credentials or identifiers associated with user profile that indicate to a group-based communication server that a client device associated with the user profile may edit access control parameters (e.g. channel settings) of respective groups and group-based communication channels having identifiers associated with the user profile. In some embodiments, group administrators transmit channel creation requests to the group-based communication server to create group-based communication channels for a particular group. Users identified as group administrators may edit the access control rights to a group or group-based communication channel which the group is a part of. Group administrators may also add users to the group or group-based communication channel which the group is a part of or to invite users to a group or group-based communication channel which the group is a part of. The access control parameters editable by the group administrator may be limited by the settings set by a super administrator.

The term "super administrator" refers to an identifier associated with a user profile that indicates to a group-based communication server that a client device associated with the user profile may control, access, and modify any group-based communication channel (including private group-based communication channels) and modify enterprise settings. The super administrator may also assign group administrator rights to members of the organization. The super administrator may delegate rights to administrators and/or users. The super administrator may also be referred to as an organization owner.

The term "enterprise settings" refers to organizationally defined network parameters, protocols, keys, limits, and policies that enable or confirm specified availability, scalability, performance, compatibility and security levels for an enterprise group-based communication system. The enterprise settings authorize (whitelist) or deauthorize (or blacklist) groups to set group specific settings. The enterprise settings authorize (whitelist) or deauthorize (or blacklist) users to perform various actions within the group-based communication system. Enterprise settings span channel creation, messaging and file usage, invitations, emoji creation, app installs, user profiles and access modes. The enterprise settings regulate all group-based communication channels and all group-based communication channels for the respective organization must comply with the enterprise settings.

The term "enterprise settings database" refers to a database, memory, collection of memory, non-volatile memory, the like, and/or any combination of mentioned and equivalent elements capable of storing enterprise settings as defined above.

The term "enterprise storage location" refers one or more storage locations in a group-based communication repository for storing messages that are associated with group-based communication channels, excluding messages that are associated with private group-based communication channels. Each group-based communication channel may be assigned its own partition inside the enterprise storage location. Location within the definition of enterprise storage location may refer to a location in memory where data is stored (e.g., a memory address) or to a portion of memory with distinct access control parameters. For example, the enterprise storage location may require different parameters for access than for access to a group storage location.

The term "group storage location" refers one or more storage locations in the group-based communication repository for storing messages that are associated with private-group-based communication channels. Each private group-based communication channel may be assigned its own group storage location. Location within the definition of group storage location may refer to a physical location in memory where data is stored (e.g., a range of memory addresses) or to part of memory with distinct access control parameters. Access to the group storage location may be controlled by group identifiers. In one embodiment, the group storage location is nested inside of the enterprise storage location. For example, for a channel access request to the group storage location for the private-group-based communication channel entitled "Development Team only", a group-based communication must receive (e.g., by querying the group-based communication repository) one or more group identifier(s) associated with the client device which generated the channel access request. A comparison is performed to determine if there exists (for the user/client device) a group identifier for the development team group associated with the "Development Team only" channel. If so, the user is allowed access to the "Development Team only" channel.

The term "global identifier" refers to one or more items of data by which a user or user's client device may be uniquely identified across the organization and the enterprise group-based communication system. In embodiments where the enterprise group-based communication system spans multiple organizations the global identifier is unique across multiple organizations. The global identifier is a 64 bit unsigned integer that uniquely identifies a user.

The term "identifier database" refers to a database, memory, collection of memory, non-volatile memory, the like, and/or any combination of mentioned and equivalent elements that stores global identifiers and group identifiers. When applicable, the identifier database associates the user's global identifier with the user's group identifiers. For example, user Chad is associated with a global identifier within the enterprise group-based communication system of 1000000006450806360. Chad also belongs to the development group and marketing group at the organization. Thus, Chad will also be associated with a development group identifier (i.e., Dev_mem) and a marketing group identifier (i.e., Mar_mem). The identifier database will contain a data table that associates the global identifier of 1000000006450806360 with Dev_mem and Mar_mem.

The term "identity server" refers to a database, a computer, a computing device, a server, and/or any combination of mentioned and equivalent elements that is capable of verifying and authenticating a user's identity based on authentication parameters. The group-based communication server may act as an identity server.

The term "open team" group type refers to access control parameters that indicate to a group-based communication server that a client device may request a group identifier for that group to be stored in a user profile. For example, if the "fun" group is an open team group type then a user may request the group identifier (for storage in the user profile) of the "fun" group and the group-based communication server will store in the user's profile the group identifier for the fun team.

The term "request to join a team" group type refers to access control parameters indicate to a group-based communication server that the group identifier for that group may only be obtained via a request to a group admin. For example, if the "fun" group is a request to join a team group type then when a user sends, to the group-based communication server, a request for the group identifier (for storage in her user profile) the group-based communication server will deny the request and send a message to a client device of a group administrator. The group administrator after receiving this message from the group-based communication server may send the user an invitation to join the group (which includes the group identifier). Thus, unlike an open team group type the group-based communication server does not automatically grant the group identifier for the group. Instead, the user must receive an invitation request for the group to obtain the group identifier for her user profile.

The term "private team" group type refers to access control parameters that indicate to a group-based communication server that the group identifier for that group may only be obtained via an invitation to join. For example, if the "fun" group is a private team group type then when a user send a request for the group identifier (for storage in his use record) to a group-based communication server, the group-based communication server will block the request and not forward a message to a group administrator. In some embodiments, a private team group type will be considered not joinable, because access is only granted via invitation from the group administrator or super administrator.

The term "whitelist" should be understood to refer to access control parameters that indicate to a group-based communication server one or more members of a group-based communication system allowed to take an action (e.g. joining a channel or group). The members may be identified by one or more identifiers such as a global identifier, user identifier, and/or group identifier.

The term "blacklist" should be understood to refer to access control parameters that indicate to a group-based communication server one or more members of a group-based communication system that are restricted from taking an action (e.g. joining a channel or group). The members may be identified by one or more identifiers such as a global identifier, user identifier, and/or group identifier.

The term "application identifier" refers to one or more items of data that uniquely identify, to a group-based communications server, an application.

The term "application install request" refers to one or more items of data that indicate to a group-based communication server a request to install an application in a group-based communication channel. The application install request can include a global identifier, a user identifier, and channel identifier.

The term "application data" refers to one or more items of data that can be used by the group-based communication server to obtain an application. The application data can include a link or source from which an application may be downloaded and authentication parameters for downloading the application The term "group-based communication repository access token" or "access token" refers to one or more items of data by which an installed application may access a particular location in group-based communication repository. The access token is an access control mechanism designed to limit the installed application from accessing unauthorized portions of the group-based communication repository. The access token corresponds to the storage location of the group-based communication channel for which the application is installed.

The term "application access request" refers to one or more items of data by which a client device may request a function from one or more installed applications in a group-based communication channel. The application access request may include a global identifier/user identifier, application identifier, and a requested application action.

The term "members of the organization", "users of the organization" and other like phrases refer to users of the group-based communication system that have global identifiers and/or user identifiers in their user profile.

Example System Architecture

Methods, apparatuses, and computer program products of the present disclosure may be embodied by any of a variety of devices. For example, the method, apparatus, and computer program product of an example embodiment may be embodied by a networked device (e.g., an), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 operates as a security apparatus for the group-based communication system 105. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like. The group-based communication repository 107 may also include applications installed and utilized in group-based communication channels.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>identifier_user_1</user_name>
            <password>abc123</password>
            //OPTIONAL <cookie>cookieidentifier</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDidentifier>3XXXXXXXXXXXXXXXXXXXXXXXXD</client_UDiden
tifier>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDidentifier>3XXXXXXXXXXXXXXXXXXXXXXXXD</client_UDiden
tifier>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDidentifier>FXXXXXXXXX-XXXX-XXXX-XXXX-
XXXXXXXXXXXX</client_UDidentifier>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
```

```
        </client_details>
        <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDidentifier>FXXXXXXXXX-XXXX-XXXX-XXXX-
XXXXXXXXXXXX</client_UDidentifier>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <message>
            <message_identifier>identifier_message_10</message_identifier>
            <team_identifier>identifier_team_ 1</team_identifier>
            <channel_identifier>identifier_channel_ 1</channel_identifier>
            <contents>That is an interesting disclosure. I have attached a copy our patent
policy.</contents>
            <attachments>patent_policy.pdf</attachments>
        </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

In embodiments, a user identifier or global identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>identifier_message_10</message_identifier>
    <team_identifier>identifier_team_ 1</team_identifier>
    <channel_identifier>identifier_channel_1</channel_identifier>
    <sending_user_identifier>identifier_user_1</sending_user_identifier>
    <topics>
        <topic>disclosures</topic>
        <topic>patents</topic>
        <topic>policies</topic>
    </topics>
    <responses>
        <response>liked by identifier_user_2</response>
        <response>starred by identifier_user_3</response>
    </responses>
    <contents>That is an interesting disclosure. I have attached a copy our patent
policy.</contents>
    <attachments>patent_policy.pdf</attachments>
    <conversation_primitive>
        conversation includes messages: identifier_message_8, identifier_message_9,
identifier_message_10,
        identifier_message_11, identifier_message_12
    </conversation_primitive>
</storage_message>
```

In embodiments, a group identifier as defined above may be associated with the message.

message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageidentifier = identifier_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the group-based communication channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). In another embodiment, the messages may be indexed to store in a group based storage location within group-based repository 107 or in an enterprise storage location within group-based repository 107.

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository107 and group-based communication circuitry 204. The apparatus 200 may be configured to execute the operations described above with respect to FIG. 1 and below with respect to FIGS. 3-8. Although these components 107 and 201-205 are described with respect to functional limitations, it should be understood that the particular implementations necessarily include the use of particular hardware. It should also be understood that certain of these components 107 and 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to a user or client device and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Enterprise and Group Identifiers

FIG. 3A illustrates an exemplary embodiment of group-based communication repository 107. Group-based communication repository 107 includes identifier database 301 enterprise settings database 303, group storage locations 305 and enterprise storage locations 307. FIG. 3B shows an exemplary database table 300 for identifier database 301. Each user of group-based communication system 105 has identification information stored in identifier database 301. Database table 300 includes global identifier 313, user identifier 305, super admin designation 307, group identifier 309, and group admin designation 311. The elements shown in FIG. 3B are also part of a user's profile.

Each member of an organization that utilizes group-based communication system is associated with a global identifier. The global identifier uniquely identifies a single user across the organization and the group-based communication system. The global identifier represents one or more user's profiles and accounts on one or more teams. This means in embodiments where the group-based communication system 105 spans multiple teams the global identifier is associated with a single user account. Whenever a request is made (e.g. API (application program interface), messaging request and the like) the request passes the global identifier of the sending user along with the request. For example, the API channels.info uses global identifiers to return a list of members in a channel. By using global identifiers the group-based communication system is able to quickly identify users and efficiently process the request.

A user's global identifier is stored alongside the user's user identification. The user identification may be a user's email address, social security number, driver's license number, a unique hardware identifier of a user's client device, IP address of a user's client device, and/or any combination of the aforementioned data. In embodiments where the user identification is an email address, the global identifier follows the change of the user's email address. This means the user's global identifier does not change simply because the user changed email addresses. Regardless of the type of user identification utilized, the global identifier always references the same user. In some embodiments, a user may have multiple user identifications associated with their global identifier to better verify it is the same user. For example, a user identification may include a user's driver's license number and email address. This way if the user changes email addresses then at least the user's driver's license number may remain the same so that there is a better chance of uniquely identifying the user according to user identification. Unique user identification is especially important where users of the group-based communication system belong (or previously belonged) to multiple organizations that use the group-based communication system.

The global identifier may be stored internally as a 64 bit unsigned integer (as shown in FIG. 3B) and represented externally (outside of memory) as a base34 encoded string. Encoding the global identifier has several technical advantages including reducing API payload (since many methods can return thousands of global identifiers) and obfuscating the actual global identifier stored in the identifier database (which increases the security of the system). In one embodiment, to create the global identifier, once a new user logs into the group-based communication system a new identification is created for the user as long as the user does have already have a global identifier (e.g. a global identifier from a previous organization). This new identification is an integer value and may be created several ways. For example, a hash can be created of the user's email address, a random number generator can be used, the user may submit a personal identification number, and the like. Once the new identification is generated a very large number (e.g. $10^{17}$, $10^{23}$, and the like) is added to the new identification, and that result is stored as the user's global identifier. For example, with reference to FIG. 3B, Amy Jones is an employee at ABC Company. ABC Company uses group-based communication system 105, but Amy has not yet used group-based communication system 105. To gain access, Amy securely logs into her account at ABC Company via single sign on (SSO) with her email address. Once Amy is securely logged in, group-based communication server 106 receives Amy's email address and uses the email as Amy's user identification. The group-based communication server then queries identifier database 301 inside group-based communication repository 107 to determine if Amy has a previously established global identifier by looking for a user identification that matches Amy's email address. Amy may have previously worked at a company or been a part of another organization that utilized group-based communication system 105 and thus may already have a global identifier that is associated with her email address or other user identification. In this case, there is no record of Amy's email as her user identification in identifier database 301. Next, group-based communication server 106 generates a new identification using a random number generator to get the value 6450806304. Group-based communication server 106 then adds a very large number $10^{17}$ to value 6450806304 to get Amy's global identifier of 10000000006450806304 (as shown in FIG. 3B). This global identifier will now always be tied to Amy Jones whenever she uses group-based communication system 105 regardless of organization.

To encode the global identifier for use within the group-based communication system (e.g. shared channel creation, shared channel communication, etc.) the group-based communication server retrieves from the global identifier from the identifier database and subtracts the very large number from the global identifier to yield a decimal value. The group-based communication server coverts the decimal value to a base34 string and adds a "W" prefix to generate an encoded global identifier. This encoded global identifier is used by various API calls inside the group-based communication system to uniquely refer to a user. In an example, to encode Amy of ABC Company's global identifier, group-based communication server 106 accesses identifier database 313 to retrieve Amy's global identifier value. Next, group-based communication server 106 subtracts $10^{17}$ from the global identifier to get the decimal value 6450806304. This value is the same as the new identification value generated before. Next decimal value 6450806304 is encoded as a base34 string with a "W" prefix to yield W06D8PQ8Y. The "W" prefix is used so that any API's used in the group-based communication system can quickly identify that this value is representative of a global identifier.

To decode the encoded global identifier, the group-based communication server performs a complimentary process. The group-based communication server receives (in conjunction with an API request) the encoded value of a user's global identifier, then drops the "W" prefix to yield the base34 string. Next, the group-based communication server coverts the base34 string to a decimal number and adds the very large number to the result to yield the global identifier. In an example, to decode Amy of ABC Company's encoded global identifier, group-based communication server 106 receives the encoded global identifier and drops the W prefix to yield a base34 string value. Next, the group-based communication server 106 converts the base34 string value to a decimal value to yield 6450806304. Then, the group-based communication server 106 adds $10^{17}$ (the very large integer) to the decimal value to yield the global identifier 10000000006450806304.

Super administrator designation 307 is a value that indicates if the user has super administrator rights within the organization. Super administrators set the parameters by which the group-based communication system operates for that particular organization. In reference to Amy of the ABC Company above, Amy has been designated as super administrator. When the group-based communication system is used for multiple organizations this value will include an identifier that identifies the organization for which the user is a super administrator.

Group identifier 309 is a value that indicates which group a user belongs to. Unlike the global identifier, a user has a different group identifier for each group they are a member of. In reference to Amy of the ABC Company above, Amy has 3 distinct group identifiers. Amy is a member of ABC Company's mobile team and has a mobile group identifier. Amy is a member of ABC Company's security team and has a security group identifier. Amy is a member of ABC Company's core product team and has a core product group identifier. When the group-based communication system is used for multiple organizations the group identifier value will include an identifier that identifies the organization which the group belong to.

Users of the group-based communication system may be able to join one or more groups based on the group type. An open team group type has access control parameters that indicate to the group-based communication server that a client device may request and be granted the group identifier for the group. This means the group is discoverable and joinable to anyone inside the organization. In reference to Amy of the ABC Company, Amy wishes to join the yoga club group in ABC Company. The yoga club group is an open team group type. Amy's client device submits a group access request to the group-based communication server with an identifier for the yoga club. The group-based communication server will query the group-based communication repository to find the yoga club and its access parameters (which are identified by its group type). The group-based communication server retrieves the group type of the yoga club and determines that it is an open team group type and grants Amy access to the yoga club and associates the corresponding group identifier (for the yoga club) with Amy's global identifier and/or user identification within the identifier databased.

A request to join a team group type has access control parameters that indicate to the group-based communication server that the group identifier for that group may only be obtained via a request to a group admin. This means that the group is discoverable by anyone inside the organization, but access to the group is limited to users that have been selected by the group administrator or super administrator. The authorized users can be indicated by a global identifier or user identification. In reference to Amy of the ABC Company, Amy wishes to join the dancing club in ABC Company. The dancing club group is a request to join a team group type. Amy's client device submits a team access request to the group-based communication server with an identifier for the dancing club. The group-based communication server will query the group-based communication repository to find the dancing club and its access parameters (which are identified by its group type). The group-based communication server retrieves the group type of the dancing club and determines that it is a request to join a team group type and sends, to a client device of an administrator of the group, a notification indicating that Amy would like to be a member. If the group administrator grants Amy's request then the group-based authentication server will store a group identifier for the dancing club with Amy's global identifier and/or user identification in the identifier database within the group-based communication repository.

A private team group type has access control parameters that indicate to the group-based communication server that the group identifier for that group may only be obtained via an invitation to join. This means that group is not discoverable or joinable except by users that have been selected by the group administrator or super administrator. The authorized users can be indicated by a global identifier or user identification. In reference to Amy of the ABC Company, Amy wishes to join the secret in ABC Company. The secret club is a private team group type. In one embodiment Amy's client device cannot submit a team access request to the group-based communication server because the secret team is not discoverable. In another embodiment, Amy's client device sends a request a team access request to the group-based communication server, the group-based communication server will block the request. In order to gain access a group administrator or a super administrator must change the access control parameters of the secret team to allow Amy access.

Group administer designation 311 is a value that indicates if the user has administrator rights for the group(s) the user belongs to. Administrators set parameters for intra team and inter team communication within the group-based communication system. In reference to Amy of the ABC Company above, Amy has been designated as an administrator only for the mobile team of ABC Company.

Once a user has been properly identified the user may take advantage of the numerous features that the group-based communication system offers, including enterprise whitelisting, shared channel communication, and other collaborative tools.

Enterprise Whitelisting

FIG. 4 illustrates exemplary process 400 for enterprise domain whitelisting. Domain whitelisting is a process by which a new user to the group-based communication system can easily join existing teams and channels, so long as the user has permission. By offering domain whitelisting, the group-based communication system is able reduce the redundancy of duplicate teams being created, improve the usability of the system, and save system memory and resources. Without domain whitelisting a new user to the group-based communication system may attempt to create a duplicate groups or channels that he did not think existed. Process 400 starts at step 401.

At step 401, the group-based communication server presents a user's client device with a log-in interface. The group-based communication server may push a link to the user's client device via an Internet connection and once the link is selected the log-in interface may be displayed on the user's client device. The log-in interface may include input locations to receive log-in parameters. For example, log-in parameters may comprise an email address, a password, username, biometric information, a personal identification number, and the like. In exemplary process 400, the user's client device receives an email address in response to displaying the user log-in interface. The email address will now function as the user's user identification.

At step 403, the user's client device sends the group-based communication server the user's email address that was entered in response to the log-in interface.

At step 405, the group-based communication server performs a challenge response authentication based on the received email address. The group-based communication server, sends a challenge, which may be a randomly generated number, to received email address. The group-based communication server then pushes to the user's client device a verification screen which requests the received challenge. If the user's client device has provided a valid email and the challenged can be accessed (via email) the user can enter the challenge into the verification screen. Once the user's client device receives the challenge it sends it to the group-based communication server. If the sent challenge matches the received response then the group-based communication server has successfully confirmed the user's email and the process moves to step 407. However, if the sent challenge does not match the received response then the group-based communication server may send an error message to the user's client device and ask for a resubmission of the challenge. In another embodiment, if the email address is not confirmed the process may return to step 401.

At step 407, the group-based communication server access the group-based communication repository to determine if a domain associated the confirmed user identifier is whitelisted. The group-based communication server may query the enterprise settings within the group-based communication repository to determine if the domain associated with the email address is whitelisted. Referring back to Amy of ABC Company, Amy has the email address amy.jones@abc.com. Using this email address, the group-based communication server would determine if the domain name "abc.com" has been previously whitelisted. The capability of having a domain whitelisted is set by one or more super administers of the organization to which the domain belongs to. The domain whitelist may be kept within the enterprise settings database. Thus, in order to determine if abc.com is whitelisted the group-based communication server queries the enterprise settings database to determine if abc.com exists in the domain whitelist. If the domain matching the email address's domain has been whitelisted then the process moves on to step 411. If the domain of the email address has not been whitelisted then the process moves to at step 409 and the process ends. Although steps 401-405 have been described as using an email address for the user identification, it is within the scope of the disclosure to use another type of user identification to determine if an associated domain is whitelisted. For example, instead of Amy entering her ABC Company email, she may enter in her employee identification number (at step 401-403) and the group-based communication server may verify her employee identification number (step 405) and recognize that the entered employee identification number is for ABC company, which is whitelisted. Thus, it can be determined if Amy is associated with a domain that has been whitelisted without providing an email with that domain.

At step 411, the group-based communication server sends to the user's client device a single sign on (SSO) page for their respective organization. Single sign on is a process by which credentials are only required one time during a session. Authentication to the group-based communication system may be performed in the same way that the user authenticates to their organization. Most companies use some type of internal identity server or external identity server (e.g. Okta®) to authenticate members of their organization. As a result, when the user enters in his authentication parameters into the user's client device in response to receiving the SSO log-in the response may be transmitted directly (or indirectly via the group-based communication server) to the proper identity server. The identity server will then authenticate the user based on the received SSO parameters.

At step 413, the group-based communication server will receive the SSO sign in response from the identity server. If positive, the process moves to step 415 if not the process may return to step 411 to allow the user's client device to retry the SSO authentication. In other embodiments, response to a negative SSO sign on, instead of allowing the chance to re-enter SSO information, process 400 may proceed to step 409. And the process is terminated. For example, with reference once again to Amy of ABC Company, ABC Company uses Okta® to provide SSO capabilities to ABC Company. When the group-based communication server pushes the SSO log-in page to Amy's client device it will have a link to log onto ABC Company using Okta® (step 411). Once Amy logs into ABC Company via Okta®, the group-based communication receives confirmation from either Okta® or ABC Company and then uses that confirmation to allow Amy to log into the group-based communication system (step 413). In some embodiments, the confirmation will include the user's credentials that were used perform the SSO. For example Amy logs into ABC Company using her email address and password. The ABC Company then sends a confirmation of Amy's successful log-in along with her email address (and possibly password) to the group-based communication server. The group-based communication server may then use the received email address (and possibly password) to authenticate Amy to the group-based communication system without requiring Amy's client device to resend her credentials. Thus process 400 allows Amy to log-in to the group-based communication system without need of a separate password or authentication parameters.

At step 415, the group-based communication server queries the group-based communication repository to push to the user's client device a group of teams and/or channels that the user is a part of or that the user is whitelisted to join. The identifier database in the group-based communication repository includes indications of which teams a user is on via one or more stored group identifier(s). In some embodiments, a group administrator or super administrator may associate a user with one or more groups prior to the user ever using the group-based communication system (e.g. for a brand new employee). For example, in reference to Amy of ABC Company, prior to Amy starting her first day at the ABC Company, the group administrators of the Mobile, Security, and Core Product groups send a request to the group-based communication server to update Amy's entry in the identifier database within the group-based communication repository to include the group identifier(s) corresponding to the Mobile, Security, and Core Product groups The group-based communication server may also query the group-based communication repository for groups and/or channels that have Amy's user identifier or global identifier whitelisted and return a list of those groups and/or channels to Amy's client device.

Process 400 may occur when a user first uses the group-based communication system, or at times after the user has already used the group-based communication system. Process 400 allows users to clearly and accurately determine which groups and/or channels they may access without undue searching. This process increases the efficiency of the group-based communication system and reduces repeat computational functions (e.g. creating and/or storing multiple groups/channels that serve the same purpose).

Shared Channel Communication

FIGS. 5 and 6 show exemplary processes 500 and 600 respectively, for creating and accessing group-based communication channels within the group-based communication system. Group-based communication channels provide a collaborative environment for users of the group-based communication system to effectively communicate amongst each other. Process 500 describes the process for creating a group-based communication channel.

At step 501, the group-based communication server receives a channel creation request from a user's client device. The channel creation request includes an originator identifier and channel settings. The originator identifier may take the form of a user's user identification and/or global identifier. The channel settings include a channel type value indicating the desired channel type, a channel name string which is one or more strings that identify the group-based communication channel, a channel purpose value which is one or more strings that detail the purpose of the group-based communication channel.

At step 503, the group-based communication server access the enterprise settings database. The group-based communication sever queries the enterprise setting database of the group-based communication repository to compare the received originator identifier and channel settings with the enterprise settings.

At step 505, the group-based communication server compares the received channel settings and the enterprise settings to determine if the group-based communication channel is authorized to be created. In one embodiment, to determine authorization, the group-based communication server first compares the received originator identifier to a list of allowed channel creators within the enterprise settings. The allowed creators list in the enterprise settings comprises a list of global identifiers and/or user identifications for users that are allowed to create group-based communication channels. If the originator identifier matches one or more entries in the list of allowed channel creators, then process 500 moves to step 509. However, if the originator identifier does not match one or more entries in the list of allowed channel creators, then process 500 moves to step 507 and the channel creation request is denied. In other embodiments, the enterprise settings comprise of a blacklist of global identifiers and/or user identifications that indicate users who are not allowed to create a group-based channel. In such an instance, process 500 would advance to step 509 if the group-based communication server does not find match between the received originator identifier and one or more entries in the list of blacklisted channel creators. The list of allowed or blacklisted channel creators may be generated automatically by the group-based communication server based on one or more parameters of the enterprise settings. For example, if a super administrator creates a requirement that only group administers may create channels, then the group-based communication server will generate the list of allowed or blacklisted channel creators based on that requirement without the super administer having to explicitly indicate which user's should be on the list. This means the group-based communication server will populate a whitelist (for example), containing all the entries in the identifier database of the group-based communication repository that have a positive group administrator designation.

At step 509, the group-based communication server determines if a channel setting does not comply with a corresponding enterprise setting. To determine if there is non-compliance, the group-based communication server compares the channel settings to corresponding enterprise settings to discover if there are one or more conflicts. To determine if a conflict has occurred the group-based communication server compares a value in the channel settings to a corresponding value in the enterprise settings and determines if the value in the channel settings does not comply with the corresponding value in the enterprise settings. For example, the received channel settings may contain a message retention value equal to 360 that indicates that the channel originator wishes to have messages in the channel saved for 360 days. However, the enterprise settings may comprise a max message retention of 200 days, indicating that the maximum limit for message retention in the organization is 200 days. Thus, a channel setting does not comply with a corresponding enterprise setting. In another embodiment, in reference to Amy of ABC Corp, Amy, as a group admin, creates a group-based communication channel for the mobile team of ABC Corp. In the channel settings, Amy indicates that third-party applications are allowed to be installed and used within the group-based communication channel. However, the enterprise settings currently indicate that no third-party applications are allowed in group-based communication channels. Thus, a channel setting does not comply with a corresponding enterprise setting. If a channel setting does not comply with a corresponding enterprise setting then process 500 moves to step 513. If all channel settings comply with their corresponding enterprise settings then process moves to step 511.

At step 511, the group-based communication server creates a channel according to the received channel settings. For example, at step 501, the group-based communication server receives channel settings comprising channel type value=group-to-group; group size value=2; first group identifier value=mobile; second group identifier value=security; message retention value=365; channel purpose value="to discuss and collaborate upcoming mobile security updates"; and channel name string="Mobile Security Roll Out."

To create the group-based communication channel, the group-based communication server generates a data structure in the group-based communication repository and assigns the data structure a newly created channel ID (that, in some examples, may correspond to a channel name string value. The group-based communication server then stores all of the received data (e.g. channel type value, group size value, first group identifier value, second group identifier value, message retention value, channel purpose value and channel string name) in the data structure having the channel ID. Any obtained whitelisted member IDs are stored within the group-based communication repository with the channel ID.

Continuing with the example in step 511, the group-based communication server creates a channel named "Mobile Security Roll Out" with a tag that will display to the members of the group-based communication channel that the purpose of the group-based communication channel is to discuss and collaborate upcoming mobile security updates. The group-based communication server accesses the identifier database to determine which users, based on comparing the first group identifier and the second group identifier with a group identifier associated with a user, are authorized to access the group-based communication channel. All messaging communication in the group-based communication channel will be stored in the group-based communication repository to a location that corresponds to the channel ID for 365 days from the commencement of the group-based communication channel.

At step 513, the group-based communication server creates the group-based communication channel using the new channel settings, which comply with the enterprise settings. Channel settings can never override the enterprise settings. For example, if the channel settings has a message retention value of 300, but the enterprise settings have a max message retention value of 200 then the group-based communication server will either send a notification to the client device indicating that the desired message retention value is too high, and asks if it is acceptable to change the message retention value to be equal or less than the max message retention value or the group-based communication server will set the message retention value equal to the max message retention value of 200.

In an embodiment, enterprise settings are hierarchical in comparison to the channel settings such that a conflict between the enterprise settings and channel settings never occurs. For example if enterprise settings indicate that a message in any channel may only be retained for 365 days then the max retention value in the channel settings may never be initially set above 365. Any restriction at the enterprise level must be adhered to at the group and channel level. However, a more restrictive setting could be set at the group level.

It is within the scope of the disclosed disclosure to employ direct messaging between members of an organization as well as group messaging between members of an organization regardless of teams. To create a direct message or group message the same process as illustrated in 500 is followed except the channel creation request would include the channel type value of direct/group message. In addition, the channel creation request would include global identifier values to indicate participants in the direct/group message. For direct or group messages, the group-based communication server may automatically populate the channel purpose value as being "direct message" and the channel name string as being originator identifier + "and" + first global identifier "chat." For example, if at step 501, the group-based communication server receives channel settings comprising channel type=private channel; group size value=2; first global identifier=W856GF6Y8 (this is the encoded global id); message retention value=365. As a result, the group-based communication server will create a channel name according to the originator's identifier and the other participant's global identifier with a tag that will indicate that the group-based communication channel is a direct messaging channel. The group-based communication server will query the identifier database to determine the user associated with the first global identifier value and authorized to access for that user's client device for the group-based communication channel. All messages in the group-based communication channel will be stored in the group-based communication repository for 365 days from the commencement of the group-based communication channel.

After the group-based communication channel is created in step 517 or 511 the process moves to 515 and FIG. 6, which details access and storage of the created channel. At step 601, the group-based communication server determines a storage location for messages in the group-based communication channel. The following table illustrates storage locations for different communication types.

TABLE 1

| Channel Type | Storage Location inside group-based communication repository |
| --- | --- |
| Messages in a public enterprise promoted channel type | Enterprise level |
| Messages in a group-to-group channel type | Enterprise level |
| Messages in a private channel type | Group specific level |
| Messages in an enterprise directed channel type | Enterprise level |

This table may be stored in the enterprise settings database and accessed as needed by the group-based communication server. When the group-based communication server creates a channel it takes compares the channel type value to values in Table 1 to determine if the messages that will be input into the group-based communication channel should be stored at the enterprise level or group specific level of the group-based communication repository. For example, if the channel type value indicates to the group-based communication server that the created channel is a group-to-group channel type then all messages input into the group-to-group channel type will be stored at the enterprise level of the group-based communication repository. Once the storage location is determined, the group-based communication system stores all messages input into the group-based communication channel in the corresponding level along with the channel name. The stored channel name string will then become the channel identifier value used in the future to access that specific channel. In one embodiment, data stored at the enterprise level is stored in a first memory address range and data stored at the group storage level is stored in a second memory address range that is different from the first memory address range. In one embodiment, the group specific storage level may be local storage located on a group administrator's client device and enterprise storage level may be cloud based storage implemented in a remote location. By storing data at different levels with different memory addresses the group-based communication server is able to quickly store and access data in the group-based communication repository. For example, if the created channel is a private channel type then the group-based communication server will store data in a second memory address range. Then whenever the group-based communication channel is accessed in the future the group-based communication server will only need to search memory in the second memory address range instead of searching the first and second memory access range. Regardless of the storage location, access to stored channel messages are only accessible to participants of that channel or super administrators.

In another embodiment, one or more applications may installed and used in group-shared channel communications. These installed applications receive from the group-based communication server a token that allows the application to have access to data stored for that group-based communication channel (e.g. channel identifier). By issuing applications that are utilized in group-shared communications a token that always such limited access it protects the data in all other group-based communication channels.

At step 603, the group-based communication server stores message communications input into the group-based communication channel into either an enterprise storage location or a group storage location. As indicated above, based on the channel type value, the group-based communication server will store messaging communications in either an enterprise storage location or a group-based storage location.

At step 605, the group-based communication server receives from a user's client device a channel access request. The channel access request comprises of a channel identifier value which will indicate to the group-based communication server the particular channel the client device wishes to access. In some embodiments, the channel access request may also include the requester's global identifier and or group identifier(s). For example, referring to Amy of ABC Company, Amy wants to gain access to a group-to-group channel named "Mobile Security Roll Out" which is a group-based communication channel for the security and mobile teams. Amy's client device sends a channel access request including at least the channel identifier value of "Mobile Security Roll Out." In response, the group-based communication server would query the group-based communication repository to find the group-based communication channel called "Mobile Security Roll Out." Once, the group-based communication server receives the channel access request process 600 moves onto step 605.

At step 607, the group-based communication server retrieves a global identifier or a group identifier associated with the client device request from an identifier database within the group-based communication repository. The group-based communication server may retrieve the global identifier of user when the received origination identifier includes a user identifier. In such an instance, the group-based communication server will query the identifier database within the group-based communication repository to determine an entry that contains the user identifier, and from that entry obtain the corresponding global identifier. In another embodiment, the group-based communication server may retrieve the global identifier from the user by receiving the global identifier from the client device, such as when the originator identifier is a global identifier. In another embodiment, the group-based communication server will query the identifier database within the group-based communication repository to determine an entry that contains the global identifier, and from that entry obtain the corresponding group identifier(s). Whether the group-based communication server will retrieve the group identifier or the global identifier will determine on the access control parameters of the group-based communication channel.

At step 609, the group-based communication server determines whether to authorize the channel access request based on a comparison of the setting settings to one of the global identifier or the group identifier. The requisite identifier(s) depend upon the channel type value of the channel settings. If the channel type indicates an enterprise directed channel type, or an enterprise promoted channel type, then the requestor's global identifier is required. If the channel type indicates a group-to-group channel type, or a private channel type then one or more of the requestor's group identifier(s) are required. For example, referring to Amy of ABC Company, Amy wants to gain access to a group-to-group channel named "Mobile Security Roll Out" which is a channel for the security and mobile teams. Amy's client device sends a channel access request with a channel identifier value of "Mobile Security Roll Out" to the group-based communication server. In one embodiment, the channel access request also includes a group identifier value equal to mobile (to indicate Amy is on the mobile team.) In another embodiment, the channel identifier value is received first by the group-based communication server, then the group-based communication server accesses the "Mobile Security Roll Out" channel and determines based on the "Mobile Security Roll Out" channel's access parameters (i.e. channel type) that Amy have a group identifier value equal to either security or mobile. In response, the group-based communication server queries Amy's client device to provide a group id. Alternatively, the channel access request may include Amy's global identifier and the group-based communication server may query the identifier database to pull one or more of Amy's group identifier(s). After the group-based communication server has received the required identifiers (if they exist) the group-based communication server uses the access control parameters identified in the channel settings of the requested channel to determine if the user's client device is authorized to access the group-based communication channel. If the user's client device is determined to be authorized then process 600 moves to step 613, if not the process moves to 611 and the process is ended. For example, with once again reference to Amy of ABC Company, Amy wants to gain access to a group-to-group channel named "Mobile Security Roll Out" which is a channel for the security and mobile teams. Amy's client device sends a channel access request with a channel identifier value of "Mobile Security Roll Out" and her global identifier to the group-based communication server. The group-based communication server (using the channel id) finds the group-based communication channel with the channel name of "Mobile Security Roll Out" and accesses its channel settings. The channel settings of "Mobile Security Roll Out" show that the channel type value indicates a group-to-group channel type, a first group identifier value is set to mobile, and a second group identifier value is set to security. This means only team members of the security and/or mobile group are authorized to access the "Mobile Security Roll Out" channel. Next, the group-based communication server queries the identifier database to determine one or more group identifier(s) associated with Amy's global identifier. The search query returns that Amy has a group identifier value equal to mobile, a group identifier value equal to security, and a group identifier value equal to core product. The group-based communication server selects either the group identifier equal to mobile or the group identifier equal to security because either one of those group ids will authorize Amy's client device's access to the "Mobile Security Roll Out" channel. Having determined according to the channel settings of the "Mobile Security Roll Out" channel that Amy is authorized based on her group identifier(s), Amy's client device is allowed to access messages, add messages, and the like in the "Mobile Security Roll Out" channel. In some embodiments, both a global identifier and a group identifier may be used to determine whether to authorize the channel access request. For example, in a channel type that is a private group-to-group channel type, access control parameters may allow only certain members of groups to be allowed to join. In one embodiment, a group-based communication server may first compare a group identifier to whitelist of group identifier(s) allowed to access the group-based communication channel, and then as a second function compare a global identifier to a whitelist of group identifier(s) allowed to access the group-based communication channel. In another embodiment, the group-based communication server may just compare a global identifier to a whitelist of group identifier(s).

In some embodiments if the user's client device sends a channel access request for a channel they do not belong to then if the a group that is part of the group-based communication channel that is an open team group type or a request to join a team group type then upon denying the channel access request, the group-based communication server may, in the case of an open team group type automatically grant access to the group by updating a corresponding user profile with the group identifier for that group and thus the desired channel or in the case of a request to join a team group type, the group-based communication server may automatically send a notification to the group administrator requesting access.

At step 613, the group-based communication server receives messaging communications from the client device and stores the messaging communications in the group-based communication channel's storage location. As detailed in step 601 the location of storage is based upon the channel type value of the group-based communication channel. Each messaging communication input into the group-based communication channel is stored in the appropriate memory location (enterprise or group specific) and is identified by the channel name/channel identifier value. Thus, the disclosure described here within enables a collaborative environment to be created that allows cross organization collaborative communications.

Exemplary Embodiment

FIG. 7 shows exemplary process 700 that may be carried out in a group-based communication system. At step 701, a group-based communication server receives from a client device a channel creation request to create a group-based communication channel within the enterprise group-based communication system. The channel creation request includes channel settings and the channel settings comprise a channel type value that indicates access control parameters. In other to determine the access control parameters, the group-based communication server, at step 703 queries the group-based repository to retrieve access control parameters associated with various channel types. The access control parameters may be stored in the enterprise storage location of the group-based repository. The channel type value may indicate to the group-based communication server an enterprise promoted channel type. The enterprise promoted channel has access control parameters that indicate that each member of the group-based communication is authorized to access the group-based communication channel. The members are indicated in the received channel settings by a member's user identifier, global identifier or group identifier. Alternatively, the channel type value may indicate to the group-based communication server a group-to-group channel type. The group-to-group channel has access control parameters that indicate access rights for members of the group-based communication system that are associated with one or more identified groups to the group-based communication channel. The identified groups are indicated in the received channel settings by referencing a member's group identifier. Alternatively, the channel type value may indicate to the group-based communication server a private channel type. The private channel has access control has access control parameters that indicate access rights for specific members of the group-based communication system. The identified members are indicated in the received channel settings by referencing a member's global identifier or user identifier.

At step 705, the group-based communication server retrieves from the enterprise storage location of the group-based communication repository enterprise settings for the group-based communication system. At step 707, the group-based communication server compares the received channel settings and the retrieved enterprise settings to determine if the requested channel is authorized to be created, and if the group-based communication channel is authorized to be created, the group-based communication server creates the group-based communication channel. At this point the group-based communication server also determines if there is a conflict between the enterprise settings and the received channel settings by comparing the received channel settings to the enterprise settings and determining if a first channel setting does not comply with a corresponding first enterprise setting. The group-based communication server may then set the first channel setting to be equal to the first enterprise setting to remedy the conflict. At step 709, the group-based communication server created the group-based communication channel with desired channel settings if there are no conflicts or a channel with modified channel settings to remedy any conflicts.

At step 711, the group-based communication server sets up a storage location for the group-based communication channel within the group-based communication repository. The storage location will be where messages communications that are input into the group-based communication channel will be stored. The storage location will either be located in the enterprise storage location or a group storage location based on the channel settings. In circumstances where the channel settings indicate an enterprise promoted channel type, the group-based communication server will receive one or more messaging communications configured for display with the group-based communication channel and store them in the an enterprise storage location determined by a channel name string present in the channel settings. In circumstances where the channel settings indicate a group-to-group channel type, the group-based communication server will receive one or more messaging communications configured for display within the group-based communication channel and store them in an enterprise storage location determined by a channel name string present in the channel settings. In the circumstances where the channel settings indicate a private channel type, the group-based communication server will receive one or more messaging communications configured for display within the group-based communication channel and store them in a group storage location determined by a channel name string present in the channel settings. The storage locations of any group-based communication channel also permits the installation of applications within the communication channel.

At step 713, the group-based communication server receives, from a client device a channel access request for access to the created group-based communication channel. In response, at step 715, the group-based communication server retrieves a group identifier or a global identifier associated with the user. In one embodiment, the channel access request contains a user identifier and the group-based communication server retrieves from the identifier database in the group-based communication repository a corresponding global identifier. In another embodiment, the channel access request includes a global identifier or a user identifier and the group-based communication server retrieves from the identifier database one or more group identifier's associated with the global identifier or the user identifier. In one embodiment, the At step 717, the group-based communication server determines based on the access control parameters of the group-based communication channel and one or more identifiers of the user if the user's client device is allowed access to the group based communication channel.

At step 719, the group-based communication server receives from a client device one or more messaging communications configured to be displayed within the group-based communication channel and at step 721 stores said messages in the dedicate storage location for that group-based communication channel within the group-based communication repository.

Applications within Group-Based Communication Channels

Group-based communication channels may have one or more first party or third party application(s) stored in corresponding memory in order to add additional functionality to the group-based communication channels. A super administrator may set enterprise settings indicating if first party and/or third party applications are allowed to be installed in group-based communication channels within the group-based communication system. If there are no such rules forbidding the installation of applications a group administrator may restrict the install of first party and/or third party applications within group-based communication channels for which they have admin rights. Exemplary process 800 shows a process for an application to be stored and used within a group-based communication channel.

At step 803, a client device sends to the group-based communication server an application install request. The application install request may include an application identifier, a global identifier or user identifier associated with the client device and a channel identifier to identify the group-based communication channel where the application will be installed.

At step 805, the group-based communication server accesses the group-based communication repository to obtain the channel settings for the group-based communication channel and enterprise settings.

At step 807, the group-based communication server determines if the application install is allowed under the enterprise settings and the channel settings of the group-based communication channel. This process is similar to step 505 in process 500, but both the channel settings and the enterprise settings are checked to determine if the application is allowed to be installed. The enterprise settings and the channel settings may contain a blacklist of application identifiers that indicate to the group-based communication server that corresponding applications may not be installed in the group-based communication channel. In another embodiment, the enterprise settings and the channel settings may contain a blacklist of user's who are not authorized to install applications in the group-based communication channel. If the application install is allowed, then process 800 moves to step 809, if not the process stops.

At 809, the group-based communication sever sends an application data request to the client device. The application data request may include a request for a link or source from which the application may be downloaded from.

At step 811, the client device sends application data to the group-based communication server. The application data may include a link or source from which the application may be downloaded from as well as any other authentication parameters needed to download the application.

At step 813, the group-based communication server, using the application data, downloads, from an application server, the application indicated in the application data. The application server may be external (for third-party applications) or internal (for first party applications) to the group-based communication system. The application is downloaded and installed to the storage location (which is described in detail in FIG. 6 items 601-603 and corresponding paragraphs) corresponding to the group-based communication channel.

At step 815, the group-based communication server sends to the application a group-based communication repository access token. This access token allows the application to only access the portion of memory in the group-based communication repository that corresponds to the group-based communication channel. The access token acts as an access control parameter in the sense that whenever the application wishes to access the group-based communication repository (which is where all of it is data is stored) it is restricted to only the portions of the group-based communication repository that correspond to the group-based communication channel. This increases the security of the system as it does not allow applications to access all of the group-based repository, which is especially advantageous when different portions of the group-based communication repository have different access control parameters. It is also helpful in the case where the application becomes compromised.

At step 817, the client device sends, to the group-based communication server, an application access request that comprises a global identifier or user identifier, application identifier, and a requested application action.

At step 819, the group based communication server, identifies the desired application via the received application identifier, confirms the client device is allowed to access the application via the global identifier and/or user identifier (by comparing it to access control parameters in the channel settings and/or enterprise settings), and forwards the requested application action to the application.

At step 821, the application using its group-based communication repository access token, accesses the group-based communication repository to complete the requested application action and at step 823, sends the result of the requested application action (i.e. requested data) to the group-based communication server.

Finally at step 825, the group-based communication server, displays within the group-based communication channel the requested data. In some embodiments, the group-based communication server may send the client device the requested data in addition to displaying the requested data or in lieu of displaying the requested data.

The following example will follow process 800. At step 803, a client device request the application "Emoji +" to be installed in the group-based communication channel named "Activities." The Install request includes an application identifier for Emoji + the channel identifier for the group-based communication channel Activities and the user identifier/client identifier from a user profile associated with the client device.

At step 805, the group-based communication server accesses the group-based communication repository to obtain the channel settings for the group-based communication channel Activities and the enterprise settings.

At step 807, the group-based communication server determines if the install of Emoji + is blacklisted under the enterprise settings or the channel settings of the group-based communication channel Activities. If the install of Emoji + is allowed, then process 800 moves to step 809, if not the process stops.

At 809, the group-based communication sever sends an application data request to the client device. The application data request includes a request for a link or source from which Emoji + may be downloaded.

At step 811, the client device sends application data to the group-based communication server. The application data includes a link or source from which Emoji + may be downloaded as well as any other authorization code for downloading Emoji +.

At step 813, the group-based communication server, using the application data, downloads from an external third party application server Emoji +. Emoji + is installed to the corresponding storage location of group-based communication channel Activities. Activities is a private group-to-group channel type, thus the messaging communications for Activities are stored in the group storage location of the group-based communication repository according to the channel identifier of "Activities." Emoji + will be downloaded and installed in the same storage location.

At step 815, the group-based communication server sends, to Emoji +, a group-based communication repository access token. This access token allows Emoji + to only access the portions of memory in the group-based communication repository that corresponds to the group-based communication channel Activities.

At step 817, the client device sends, to the group-based communication server, an application access request that comprises an associated user's global identifier, the application identifier for Emoji +, and the requested application action to produce a special type of emoji.

At step 819, the group based communication server, identifies Emoji + via the received application identifier, confirms the client device is allowed to access Emoji + via the global identifier and forwards the requested application action of producing a special type of emoji to Emoji +.

At step 821, Emoji + using its group-based communication repository access token, accesses the group-based communication repository and the storage location corresponding to the group-based communication channel Activities to pull from stored application files the data needed to produce the special type of emoji. At step 823, Emoji + sends the special type of emoji to the group-based communication server.

Finally at step 825, the group-based communication server, displays within the group-based communication channel Activities the special type of emoji.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A group-based communication server in an enterprise group-based communication system, the enterprise group-based communication system comprising a plurality of group-based communication channels, the group-based communication server comprising at least one processor and at least one memory including computer program code, the at least one memory and the computer program code configured to, with the at least one processor, cause the group-based communication server to:

receive a channel creation request to create a group-based communication channel within the enterprise group-based communication system, wherein the channel creation request comprises channel settings, and wherein the channel settings comprise one or more authorized group identifiers for accessing the group-based communication channel;

retrieve enterprise settings from an enterprise settings database, wherein the enterprise settings regulate each group-based communication channel of a plurality of group-based communication channels, and wherein the enterprise settings comprise a group identifier whitelist;

determine, based on a comparison of the channel settings and the enterprise settings, if the group-based communication channel is authorized for creation; and in circumstances when it is determined that the group-based communication channel is authorized:

create the group-based communication channel according to the channel settings;

store messaging communication that is posted to the group-based communication channel to either an enterprise storage location or a group storage location based on the channel settings;

wherein the enterprise storage location is in a first memory address range and the group storage location is in a second memory address range different from the first memory address range;

receive a channel access request from a client device associated with the group-based communication channel;

retrieve a global identifier or a group identifier associated with the client device from an identifier database; and determine whether to authorize the channel access request based on comparing the channel settings to one of the global identifier or the group identifier.

2. The group-based communication server of claim 1, wherein the channel settings comprise a channel type value that indicates access control parameters, and the group-based communication server is further configured to create the group-based communication channel according to the access control parameters.

3. The group-based communication server of claim 2, further configured to determine that the channel type value indicates an enterprise promoted channel type, and, in response, authorize access rights for each member of a corresponding enterprise to the group-based communication channel.

4. The group-based communication server of claim 2, further configured to determine that the channel type value indicates a group-to-group channel type, and in response authorize access rights for members of the group-based communication system that are associated with one or more identified groups to the group-based communication channel, wherein the one or more identified groups are indicated in the channel settings.

5. The group-based communication server of claim 2, further configured to determine that the channel type value indicates a private channel type, and in response authorize access rights for specific members of the group-based communication system to the group-based communication channel, wherein the specific members are indicated in the channel settings.

6. The group-based communication server of claim 3, further configured to receive one or more messaging communications configured for display within the group-based communication channel and store to the enterprise storage location the received one or more messaging communications, wherein the enterprise storage location is further determined by a channel name string present in the channel settings.

7. The group-based communication server of claim 4, further configured to receive one or more messaging communications configured for display within the group-based communication channel and store in the enterprise storage location the received one or more messaging communications, wherein the enterprise storage location is further determined by a channel name string present in the channel settings.

8. The group-based communication server of claim 5, further configured to receive one or more messaging communications configured for display within the group-based communication channel and store to the group storage location the received one or more messaging communications, wherein the group storage location is further determined by a channel name string present in the channel settings.

9. The group-based communication server of claim 3, wherein the channel access request includes a user identification value associated with the client device, wherein the user identification value is different from the global identifier and the group identifier; and the group-based communication server is further configured to retrieve, from the identifier database, a global identifier associated with the client device based on the user identification value, and determine whether to authorize the client device access to the group-based communication channel based on the global identifier.

10. The group-based communication server of claim 4, wherein the channel access request includes a user identification value associated with the client device or the global identifier associated with the client device, wherein the user identification value is different from the global identifier and the group identifier; and the group-based communication server is further configured to retrieve, from the identifier database, a group identifier associated with the client device based on the user identification value or the global identifier, and determine whether to authorize the client device access to the group-based communication channel based on a comparison of the group identifier and the channel settings.

11. The group-based communication server of claim 5, wherein the channel access request includes a user identification value associated with the client device wherein the user identification value is different from the global identifier and the group identifier; and the group-based communication server is further configured to retrieve, from the identifier database, a global identifier and at least one group identifier associated with the client device based on the user identification value, and determine whether to authorize the client device access to the group-based communication channel based on a comparison of the group identifier, the global identifier, and the channel settings.

12. The group-based communication server of claim 1, further configured to:

compare the received channel settings to the enterprise settings;

determine a first channel setting that does not comply with a corresponding first enterprise setting, and set the first channel setting to be equal to the first enterprise setting.

13. The group-based communication server of claim 1, wherein the channel settings include an originator identifier that indicates an originator of the channel creation request for the group-based communication channel.

14. A method for authorizing communication in an enterprise group-based communication system, the method comprising the steps of:

receiving, by a group-based communication server, a channel creation request to create a group-based communication channel within the enterprise group-based communication system, wherein the channel creation request includes channel settings, and wherein the channel settings comprise one or more authorized group identifiers for accessing the group-based communication channel;

accessing, by the group-based communication server, an enterprise settings database to retrieve enterprise settings that regulate all group-based communication channels in the enterprise group-based communication system, and wherein the enterprise settings comprise a group identifier whitelist;

determining, by the group-based communication server, based on a comparison of the channel settings and the enterprise settings, if the group-based communication channel is authorized for creation; and in circumstances when it is determined that the group-based communication channel is authorized:

creating, by the group-based communication server, the group-based communication channel according to the channel settings;

storing, by the group-based communication server, a messaging communication that is transmitted to the group-based communication channel to either an enterprise storage location or a group storage location based on the channel settings;

wherein the enterprise storage location is in a first memory address range and the group storage location is in a second memory address range different from the first memory address range;

receiving, by the group-based communication server, a channel access request from a client device associated with the group-based communication channel;

retrieving, by the group-based communication server, a global identifier or a group identifier associated with the client device from an identifier database; and determining, by the group-based communication server, whether to authorize the channel access request based on comparing the channel settings to one of the global identifier or the group identifier.

15. The method of claim 14, wherein the channel settings comprise a channel type value that indicates access control parameters, and the method further comprises creating, by the group-based communication server, the group-based communication channel according to the access control parameters.

16. The method of claim 15, further comprising determining, by the group-based communication server, determine that the channel type value indicates an enterprise promoted channel type, and in response authorizing access rights for each member of a corresponding enterprise to the group-based communication channel.

17. The method of claim 15, further comprising determining, by the group-based communication server, that the channel type value indicates a group-to-group channel type, and in response authorizing access rights for members of the group-based communication system that are associated with one or more identified groups to the group-based communication channel, wherein the one or more identified groups are indicated in the channel settings.

18. The method of claim 15, further comprising determining, by the group-based communication server, that the channel type value indicates a private channel type, and in response authorizing, by the group-based communication server, access rights for specific members of the group-based communication system to the group-based communication channel, wherein the specific members are indicated in the channel settings.

19. The method of claim 16, further comprising receiving, by the group-based communication server, one or more messaging communications configured for display within the group-based communication channel and storing, by the group-based communication server, in the enterprise storage location, the received one or more messaging communications, wherein the enterprise storage location is further determined by a channel name string present in the channel settings.

20. The method of claim 17, further comprising receiving, by the group-based communication server, one or more messaging communications configured for display within the group-based communication channel and storing, by the group-based communication server, in the enterprise storage location, the received one or more messaging communications, wherein the enterprise storage location is further determined by a channel name string present in the channel settings.

21. The method of claim 18, further comprising receiving, by the group-based communication server, one or more messaging communications configured for display within the group-based communication channel and storing, by the group-based communication server, in the group storage location the received one or more messaging communications, wherein the group storage location is further determined by a channel name string present in the channel settings.

22. The method of claim 16, wherein the channel access request includes a user identification value associated with the client device, wherein the user identification value is different from the global identifier and the group identifier; and the method further comprises retrieving, by the group-based communication server, from the identifier database, a global identifier associated with the client device based on the user identification value, and determining, by the group-based communication server, whether to authorize the client device access to the group-based communication channel based on the global identifier.

23. The method of claim 17, wherein the channel access request includes a user identification value associated with the client device or the global identifier associated with the client device, wherein the user identification value is different from the global identifier and the group identifier; and the method further comprises retrieving, by the group-based communication server, from the identifier database, a group identifier associated with the client device based on the user identification value or the global identifier, and determining, by the group-based communication server, whether to authorize the client device access to the group-based communication channel based on a comparison of the group identifier and the channel settings.

24. The method of claim 18, wherein the channel access request includes a user identification value associated with the client device, wherein the user identification value is different from a global identifier and the group identifier; and the method further comprises retrieving, by the group-based communication server, from the identifier database, a global identifier and at least one group identifier associated with the client device based on the user identification value, and determining, by the group-based communication server, whether to authorize the client device access to the group-based communication channel based on a comparison of the group identifier, the global identifier, and the channel settings.

25. The method of claim 14, further comprising:
comparing the received channel settings to the enterprise settings; and
determining a first channel setting that does not comply with a corresponding first enterprise setting, and setting the first channel setting to be equal to the first enterprise setting.

26. The method of claim 14, wherein the channel settings include an originator identifier that indicates an originator of the channel creation request for the group-based communication channel.

27. An enterprise group-based communication system for controlling access to one or more group-based communication channels comprising a group-based communication repository comprising an enterprise settings database and an identifier database and a group-based communication server configured to:

receive a channel creation request to create a group-based communication channel within the enterprise group-based communication system, wherein the channel creation request includes channel settings, and wherein the channel settings comprise one or more authorized group identifiers for accessing the group-based communication channel;

access the enterprise settings database to retrieve enterprise settings that regulate all group-based communication channels in the enterprise group-based communication system;

determine, based on a comparison of the channel settings and the enterprise settings, if the group-based communication channel is authorized for creation, and wherein the enterprise settings comprise a group identifier whitelist; and in circumstances when it is determined that the group-based communication channel is authorized:
create the group-based communication channel according to the channel settings;
store a messaging communication that is input into the group-based communication channel to either an enterprise storage location or a group storage location based on the channel settings;
wherein the enterprise storage location is in a first memory address range and the group storage location is in a second memory address range different from the first memory address range;
receive a channel access request from a client device associated with the group-based communication channel;
retrieve a global identifier or a group identifier associated with the client device from the identifier database; and
determine whether to authorize the channel access request based on comparing the channel settings to one of the global identifier or the group identifier.

28. The group-based communication server of claim 4, further configured to:
retrieve, from the identifier database, the global identifier associated with the client device;
determine one or more group identifiers associated with the global identifier;
determine whether to authorize the client device access to the group-based communication channel based on a comparison of the one or more group identifiers with two or more of the one or more identified groups; and
in circumstances where at least one of the one or more group identifiers does not match at least one of the two or more identified groups:
in response to determining, based on access control parameters of the two or more identified groups that at least one of the two or more identified groups is joinable, transmit a request to a client device of a group administrator of at least one of the two or more identified groups requesting access to the group for the client device.

29. The method of claim 17, further comprising
retrieving, by the group-based communication server, from the identifier database, the global identifier associated with the client device;
determining, by the group-based communication server, one or more group identifiers associated with the global identifier;
determining, by the group-based communication server, whether to authorize the client device access to the group-based communication channel based on a comparison of the one or more group identifiers with the two or more identified groups; and in circumstances where at least one of the one or more group identifiers does not match at least one of the two or more identified groups:
    in response to determining, by the group-based communication server and based on access control parameters of the two or more identified groups that at least one of the two or more identified groups is joinable, transmitting a request to a client device of a group administrator of at least one of the two or more identified groups requesting access to the group for the client device.

\* \* \* \* \*